United States Patent
Walton et al.

(10) Patent No.: US 10,742,358 B2
(45) Date of Patent: *Aug. 11, 2020

(54) METHOD AND APPARATUS FOR PROVIDING AN EFFICIENT CONTROL CHANNEL STRUCTURE IN A WIRELESS COMMUNICATION SYSTEM

(71) Applicant: QUALCOMM Incorporated, San Diego, CA (US)

(72) Inventors: Jay Rodney Walton, Carlisle, MA (US); John Wendell Ketchum, Harwich, MA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 15/871,482

(22) Filed: Jan. 15, 2018

(65) Prior Publication Data

US 2018/0191466 A1 Jul. 5, 2018

Related U.S. Application Data

(63) Continuation of application No. 15/158,481, filed on May 18, 2016, now Pat. No. 9,876,609, which is a
(Continued)

(51) Int. Cl.
*H04W 24/02* (2009.01)
*H04B 7/26* (2006.01)
(Continued)

(52) U.S. Cl.
CPC .............. *H04L 1/06* (2013.01); *H04B 7/2643* (2013.01); *H04L 1/0002* (2013.01);
(Continued)

(58) Field of Classification Search
CPC ... H04L 1/0002; H04L 1/0071; H04L 1/0067; H04L 1/06; H04L 1/0093
See application file for complete search history.

(56) References Cited

U.S. PATENT DOCUMENTS

| 4,736,371 A | 4/1988 | Tejima et al. |
| 4,750,198 A | 6/1988 | Harper |

(Continued)

FOREIGN PATENT DOCUMENTS

| AU | 2002259221 | 11/2002 |
| CA | 2690245 A1 | 10/2001 |

(Continued)

OTHER PUBLICATIONS 3 rd Generation Partnership Project (3GPP); Technical Specification Group (TSG); Radio Access Network (RAN); RF requirements f o r 1.28Mcps UTRA TDD option, 3GPP Standard; 3G TR 25.945, 3rd Generation Partnership Project (3GPP), Mobile Competence Centre; 650, Route Des Lucioles ; F-06921 Sophia-Antipolis Cedex; France, No. V2.0.0, Dec. 20, 2000 (Dec. 20, 2000), pp. 1-144, XP050400193, [retrieved on Dec. 20, 2000], p. 126.
(Continued)

*Primary Examiner* — Raj Jain
(74) *Attorney, Agent, or Firm* — Kristine U. Ekwueme; Patterson + Sheridan, L.L.P.

(57) ABSTRACT

According to one aspect of the invention, a method is provided in which a control channel used for transmitting control information is partitioned into a plurality of subchannels each of which is operated at a specific data rate. For each of one or more user terminals, one of the subchannels is selected based on one or more selection criteria for transmitting control information from an access point to the respective user terminal. Control information is transmitted from the access point to a user terminal on a particular subchannel selected for the respective user terminal. At the
(Continued)

user terminal, one or more subchannels are decoded to obtain control information designated for the user terminal.

30 Claims, 10 Drawing Sheets

Related U.S. Application Data continuation of application No. 10/725,904, filed on Dec. 1, 2003, now Pat. No. 9,473,269.

(51) Int. Cl.
  *H04L 1/00* (2006.01)
  *H04L 27/26* (2006.01)
  *H04L 1/16* (2006.01)
  *H04W 84/12* (2009.01)
  *H04L 1/06* (2006.01)
  *H04L 25/02* (2006.01)
  *H04W 28/18* (2009.01)
  *H04W 72/14* (2009.01)
  *H04W 72/04* (2009.01)

(52) U.S. Cl.
  CPC ........ *H04L 1/0025* (2013.01); *H04L 25/0204* (2013.01); *H04L 27/261* (2013.01); *H04W 24/02* (2013.01); *H04W 28/18* (2013.01); *H04W 72/0406* (2013.01); *H04W 72/14* (2013.01); *H04L 1/16* (2013.01); *H04L 2001/0093* (2013.01); *H04W 84/12* (2013.01)

(56) References Cited

U.S. PATENT DOCUMENTS

| | | |
|---|---|---|
| 4,797,879 A | 1/1989 | Habbab et al. |
| 5,239,677 A | 8/1993 | Jasinski |
| 5,241,544 A | 8/1993 | Jasper et al. |
| 5,295,159 A | 3/1994 | Kerpez |
| 5,404,355 A | 4/1995 | Raith |
| 5,422,733 A | 6/1995 | Merchant et al. |
| 5,471,647 A | 11/1995 | Gerlach et al. |
| 5,479,447 A | 12/1995 | Chow et al. |
| 5,491,837 A | 2/1996 | Haartsen |
| 5,493,712 A | 2/1996 | Ramesh et al. |
| 5,506,861 A | 4/1996 | Bottomley |
| 5,509,003 A | 4/1996 | Snijders et al. |
| 5,528,581 A | 6/1996 | De Bot |
| 5,606,729 A | 2/1997 | Damico et al. |
| 5,638,369 A | 6/1997 | Ayerst et al. |
| 5,677,909 A | 10/1997 | Heide |
| 5,710,768 A | 1/1998 | Ziv et al. |
| 5,729,542 A | 3/1998 | Dupont |
| 5,790,550 A | 8/1998 | Peeters et al. |
| 5,799,005 A | 8/1998 | Soliman |
| 5,818,813 A | 10/1998 | Saito et al. |
| 5,822,374 A | 10/1998 | Levin |
| 5,832,387 A | 11/1998 | Bae et al. |
| 5,859,875 A | 1/1999 | Kato et al. |
| 5,867,478 A | 2/1999 | Baum et al. |
| 5,867,539 A | 2/1999 | Koslov |
| 5,883,887 A | 3/1999 | Take et al. |
| 5,886,988 A | 3/1999 | Yun et al. |
| 5,929,810 A | 7/1999 | Koutsoudis et al. |
| 5,959,965 A | 9/1999 | Ohkubo et al. |
| 5,963,589 A | 10/1999 | Nagano et al. |
| 5,973,638 A | 10/1999 | Robbins et al. |
| 5,982,327 A | 11/1999 | Vook et al. |
| 6,005,876 A | 12/1999 | Cimini, Jr. et al. |
| 6,011,963 A | 1/2000 | Ogoro |
| 6,014,429 A * | 1/2000 | LaPorta ............... H04M 3/533 340/7.21 |
| 6,049,548 A | 4/2000 | Bruno et al. |
| 6,067,290 A | 5/2000 | Paulraj et al. |
| 6,072,779 A | 6/2000 | Tzannes et al. |
| 6,084,915 A | 7/2000 | Williams |
| 6,097,771 A | 8/2000 | Foschini |
| 6,115,354 A | 9/2000 | Weck |
| 6,122,247 A | 9/2000 | Levin et al. |
| 6,131,016 A | 10/2000 | Greenstein et al. |
| 6,141,388 A | 10/2000 | Servais et al. |
| 6,141,542 A | 10/2000 | Kotzin et al. |
| 6,141,555 A | 10/2000 | Sato |
| 6,141,567 A | 10/2000 | Youssefmir et al. |
| 6,144,711 A | 11/2000 | Raleigh et al. |
| 6,154,661 A | 11/2000 | Goldburg |
| 6,163,296 A | 12/2000 | Lier et al. |
| 6,167,031 A | 12/2000 | Olofsson et al. |
| 6,175,588 B1 | 1/2001 | Visotsky et al. |
| 6,178,196 B1 | 1/2001 | Naguib et al. |
| 6,192,256 B1 | 2/2001 | Whinnett |
| 6,205,410 B1 | 3/2001 | Cai |
| 6,222,888 B1 | 4/2001 | Kao et al. |
| 6,232,918 B1 | 5/2001 | Wax et al. |
| 6,266,528 B1 | 7/2001 | Farzaneh |
| 6,272,354 B1 | 8/2001 | Saario |
| 6,275,543 B1 | 8/2001 | Petrus et al. |
| 6,278,726 B1 | 8/2001 | Mesecher et al. |
| 6,292,917 B1 | 9/2001 | Sinha et al. |
| 6,298,035 B1 | 10/2001 | Heiskala |
| 6,298,092 B1 | 10/2001 | Heath, Jr. et al. |
| 6,308,080 B1 | 10/2001 | Burt et al. |
| 6,310,704 B1 | 10/2001 | Dogan et al. |
| 6,314,113 B1 | 11/2001 | Guemas |
| 6,314,289 B1 | 11/2001 | Eberlein et al. |
| 6,317,467 B1 | 11/2001 | Cox et al. |
| 6,317,612 B1 | 11/2001 | Farsakh |
| 6,330,277 B1 | 12/2001 | Gelblum et al. |
| 6,330,293 B1 | 12/2001 | Klank et al. |
| 6,330,462 B1 | 12/2001 | Chen |
| 6,333,953 B1 | 12/2001 | Bottomley et al. |
| 6,339,399 B1 | 1/2002 | Andersson et al. |
| 6,345,036 B1 | 2/2002 | Sudo et al. |
| 6,346,910 B1 | 2/2002 | Ito |
| 6,347,217 B1 | 2/2002 | Bengtsson et al. |
| 6,347,234 B1 | 2/2002 | Scherzer |
| 6,348,036 B1 | 2/2002 | Looney et al. |
| 6,351,499 B1 | 2/2002 | Paulraj et al. |
| 6,357,499 B1 | 3/2002 | Kralevich et al. |
| 6,363,267 B1 | 3/2002 | Lindskog et al. |
| 6,369,758 B1 | 4/2002 | Zhang |
| 6,377,812 B1 | 4/2002 | Rashid-Farrokhi et al. |
| 6,385,264 B1 | 5/2002 | Terasawa et al. |
| 6,389,056 B1 | 5/2002 | Kanterakis et al. |
| 6,426,971 B1 | 7/2002 | Wu et al. |
| 6,452,981 B1 | 9/2002 | Raleigh et al. |
| 6,463,290 B1 | 10/2002 | Stilp et al. |
| 6,473,467 B1 | 10/2002 | Wallace et al. |
| 6,478,422 B1 | 11/2002 | Hansen |
| 6,492,942 B1 | 12/2002 | Kezys |
| 6,510,184 B1 | 1/2003 | Okamura |
| 6,512,737 B1 | 1/2003 | Agee |
| 6,515,617 B1 | 2/2003 | Demers et al. |
| 6,532,225 B1 | 3/2003 | Chang et al. |
| 6,532,562 B1 | 3/2003 | Chou et al. |
| 6,545,997 B1 | 4/2003 | Boehnke et al. |
| 6,574,211 B2 | 6/2003 | Padovani et al. |
| 6,574,267 B1 | 6/2003 | Kanterakis et al. |
| 6,574,271 B2 | 6/2003 | Mesecher et al. |
| 6,590,883 B1 | 7/2003 | Kitade et al. |
| 6,594,473 B1 | 7/2003 | Dabak et al. |
| 6,594,798 B1 | 7/2003 | Chou et al. |
| 6,597,682 B1 * | 7/2003 | Kari ..................... H04J 3/1647 370/329 |
| 6,608,874 B1 | 8/2003 | Beidas et al. |
| 6,611,231 B2 | 8/2003 | Crilly et al. |
| 6,615,024 B1 | 9/2003 | Boros et al. |
| 6,628,702 B1 | 9/2003 | Rowitch et al. |
| 6,631,121 B1 | 10/2003 | Yoon |
| 6,636,496 B1 | 10/2003 | Cho et al. |
| 6,636,568 B2 | 10/2003 | Kadous |
| 6,654,590 B2 | 11/2003 | Boros et al. |
| 6,654,613 B1 | 11/2003 | Maeng et al. |

(56) References Cited

U.S. PATENT DOCUMENTS

| | | | |
|---|---|---|---|
| 6,668,161 B2 | 12/2003 | Boros et al. | |
| 6,683,916 B1 | 1/2004 | Sartori et al. | |
| 6,690,660 B2 | 2/2004 | Kim et al. | |
| 6,693,992 B2 | 2/2004 | Jones et al. | |
| 6,694,155 B1 | 2/2004 | Chin et al. | |
| 6,697,346 B1 | 2/2004 | Halton et al. | |
| 6,711,121 B1 | 3/2004 | Gerakoulis et al. | |
| 6,721,267 B2 | 4/2004 | Hiben et al. | |
| 6,728,233 B1 | 4/2004 | Park et al. | |
| 6,731,668 B2 | 5/2004 | Ketchum | |
| 6,735,188 B1 | 5/2004 | Becker et al. | |
| 6,738,020 B1 | 5/2004 | Lindskog et al. | |
| 6,744,811 B1 | 6/2004 | Kantschuk | |
| 6,747,963 B1 | 6/2004 | Park et al. | |
| 6,751,187 B2 | 6/2004 | Walton et al. | |
| 6,751,199 B1 | 6/2004 | Sindhushayana et al. | |
| 6,751,444 B1 | 6/2004 | Meiyappan | |
| 6,751,480 B2 | 6/2004 | Kogiantis et al. | |
| 6,757,263 B1 | 6/2004 | Olds | |
| 6,760,313 B1 | 7/2004 | Sindhushayana et al. | |
| 6,760,388 B2 | 7/2004 | Ketchum et al. | |
| 6,760,882 B1 | 7/2004 | Gesbert et al. | |
| 6,763,244 B2 | 7/2004 | Chen et al. | |
| 6,768,727 B1 | 7/2004 | Sourour et al. | |
| 6,771,706 B2 | 8/2004 | Ling et al. | |
| 6,785,341 B2 | 8/2004 | Walton et al. | |
| 6,785,513 B1 | 8/2004 | Sivaprakasam | |
| 6,788,948 B2 | 9/2004 | Lindskog et al. | |
| 6,792,041 B1 | 9/2004 | Kim et al. | |
| 6,795,424 B1 | 9/2004 | Kapoor et al. | |
| 6,798,738 B1 | 9/2004 | Do et al. | |
| 6,801,790 B2 | 10/2004 | Rudrapatna | |
| 6,802,035 B2 | 10/2004 | Catreux et al. | |
| 6,804,191 B2 | 10/2004 | Richardson | |
| 6,821,535 B2 | 11/2004 | Nurmi et al. | |
| 6,842,460 B1 | 1/2005 | Olkkonen et al. | |
| 6,847,828 B2 | 1/2005 | Miyoshi et al. | |
| 6,850,252 B1 | 2/2005 | Hoffberg | |
| 6,850,494 B1 * | 2/2005 | Bender | H04W 24/02 370/254 |
| 6,850,498 B2 | 2/2005 | Heath et al. | |
| 6,859,503 B2 | 2/2005 | Pautler et al. | |
| 6,862,271 B2 | 3/2005 | Medvedev et al. | |
| 6,862,440 B2 | 3/2005 | Sampath | |
| 6,868,079 B1 | 3/2005 | Hunt | |
| 6,873,651 B2 | 3/2005 | Tesfai et al. | |
| 6,879,578 B2 | 4/2005 | Pan et al. | |
| 6,879,579 B1 | 4/2005 | Myles et al. | |
| 6,882,868 B1 | 4/2005 | Shattil | |
| 6,885,708 B2 | 4/2005 | Thomas et al. | |
| 6,888,809 B1 | 5/2005 | Foschini et al. | |
| 6,888,899 B2 | 5/2005 | Raleigh et al. | |
| 6,891,858 B1 | 5/2005 | Mahesh et al. | |
| 6,907,270 B1 | 6/2005 | Blanz | |
| 6,920,192 B1 | 7/2005 | Laroia et al. | |
| 6,920,194 B2 | 7/2005 | Stopler et al. | |
| 6,927,728 B2 | 8/2005 | Vook et al. | |
| 6,937,592 B1 | 8/2005 | Heath, Jr. et al. | |
| 6,940,917 B2 | 9/2005 | Menon et al. | |
| 6,950,632 B1 | 9/2005 | Yun et al. | |
| 6,952,426 B2 | 10/2005 | Wu et al. | |
| 6,952,454 B1 | 10/2005 | Jalali et al. | |
| 6,956,813 B2 | 10/2005 | Fukuda | |
| 6,956,897 B1 | 10/2005 | Honig | |
| 6,956,906 B2 | 10/2005 | Tager et al. | |
| 6,959,171 B2 | 10/2005 | Tsien et al. | |
| 6,961,388 B2 | 11/2005 | Ling et al. | |
| 6,963,741 B2 | 11/2005 | Johansson et al. | |
| 6,963,742 B2 | 11/2005 | Boros et al. | |
| 6,965,762 B2 | 11/2005 | Sugar et al. | |
| 6,970,722 B1 | 11/2005 | Lewis | |
| 6,975,868 B2 | 12/2005 | Joshi et al. | |
| 6,980,601 B2 | 12/2005 | Jones | |
| 6,980,800 B2 | 12/2005 | Noerpel et al. | |
| 6,985,434 B2 | 1/2006 | Wu et al. | |
| 6,985,534 B1 | 1/2006 | Meister | |
| 6,987,819 B2 | 1/2006 | Thomas et al. | |
| 6,990,059 B1 | 1/2006 | Anikhindi et al. | |
| 6,992,972 B2 | 1/2006 | Van Nee | |
| 6,996,380 B2 | 2/2006 | Dent | |
| 7,002,900 B2 | 2/2006 | Walton et al. | |
| 7,003,044 B2 | 2/2006 | Subramanian et al. | |
| 7,006,464 B1 | 2/2006 | Gopalakrishnan et al. | |
| 7,006,483 B2 | 2/2006 | Nelson, Jr. et al. | |
| 7,006,848 B2 | 2/2006 | Ling et al. | |
| 7,009,931 B2 | 3/2006 | Ma et al. | |
| 7,012,978 B2 | 3/2006 | Talwar | |
| 7,020,110 B2 | 3/2006 | Walton et al. | |
| 7,020,482 B2 | 3/2006 | Medvedev et al. | |
| 7,020,490 B2 | 3/2006 | Khatri | |
| 7,023,826 B2 | 4/2006 | Sjoberg et al. | |
| 7,024,163 B1 | 4/2006 | Barratt et al. | |
| 7,031,671 B2 | 4/2006 | Mottier | |
| 7,035,359 B2 | 4/2006 | Molnar | |
| 7,039,125 B2 | 5/2006 | Friedman | |
| 7,039,363 B1 | 5/2006 | Kasapi et al. | |
| 7,042,858 B1 | 5/2006 | Ma et al. | |
| 7,043,259 B1 | 5/2006 | Trott | |
| 7,054,378 B2 | 5/2006 | Walton et al. | |
| 7,058,367 B1 | 6/2006 | Luo et al. | |
| 7,062,294 B1 | 6/2006 | Rogard et al. | |
| 7,068,628 B2 | 6/2006 | Li et al. | |
| 7,072,381 B2 | 7/2006 | Atarashi et al. | |
| 7,072,410 B1 | 7/2006 | Monsen | |
| 7,072,413 B2 | 7/2006 | Walton et al. | |
| 7,076,263 B2 | 7/2006 | Medvedev et al. | |
| 7,088,671 B1 | 8/2006 | Monsen | |
| 7,095,709 B2 | 8/2006 | Walton et al. | |
| 7,095,722 B1 | 8/2006 | Walke et al. | |
| 7,099,377 B2 | 8/2006 | Berens et al. | |
| 7,103,325 B1 | 9/2006 | Jia et al. | |
| 7,110,378 B2 | 9/2006 | Onggosanusi et al. | |
| 7,110,463 B2 | 9/2006 | Wallace et al. | |
| 7,113,499 B2 | 9/2006 | Nafie et al. | |
| 7,116,652 B2 | 10/2006 | Lozano | |
| 7,120,134 B2 | 10/2006 | Tiedemann et al. | |
| 7,120,199 B2 | 10/2006 | Thielecke et al. | |
| 7,120,657 B2 | 10/2006 | Ricks et al. | |
| 7,127,009 B2 | 10/2006 | Berthet et al. | |
| 7,130,362 B2 | 10/2006 | Girardeau et al. | |
| 7,133,459 B2 | 11/2006 | Onggosanusi et al. | |
| 7,137,047 B2 | 11/2006 | Mitlin et al. | |
| 7,149,190 B1 | 12/2006 | Li et al. | |
| 7,149,239 B2 | 12/2006 | Hudson | |
| 7,149,254 B2 | 12/2006 | Sampath | |
| 7,151,809 B2 | 12/2006 | Ketchum et al. | |
| 7,155,171 B2 | 12/2006 | Ebert et al. | |
| 7,158,563 B2 | 1/2007 | Ginis et al. | |
| 7,164,649 B2 | 1/2007 | Walton et al. | |
| 7,164,669 B2 | 1/2007 | Li et al. | |
| 7,184,713 B2 | 2/2007 | Kadous et al. | |
| 7,187,646 B2 | 3/2007 | Schramm | |
| 7,190,749 B2 | 3/2007 | Levin et al. | |
| 7,191,381 B2 | 3/2007 | Gesbert et al. | |
| 7,194,237 B2 | 3/2007 | Sugar et al. | |
| 7,197,084 B2 | 3/2007 | Ketchum et al. | |
| 7,200,404 B2 | 4/2007 | Panasik et al. | |
| 7,206,354 B2 | 4/2007 | Wallace et al. | |
| 7,218,684 B2 | 5/2007 | Bolourchi et al. | |
| 7,221,956 B2 | 5/2007 | Medvedev et al. | |
| 7,224,704 B2 | 5/2007 | Lu et al. | |
| 7,231,184 B2 | 6/2007 | Eilts et al. | |
| 7,233,625 B2 | 6/2007 | Ma et al. | |
| 7,238,508 B2 | 7/2007 | Lin et al. | |
| 7,242,727 B2 | 7/2007 | Liu et al. | |
| 7,248,638 B1 | 7/2007 | Banister | |
| 7,248,841 B2 | 7/2007 | Agee et al. | |
| 7,254,171 B2 | 8/2007 | Hudson | |
| 7,260,153 B2 | 8/2007 | Nissani et al. | |
| 7,260,366 B2 | 8/2007 | Lee et al. | |
| 7,263,119 B1 | 8/2007 | Hsu et al. | |
| 7,269,127 B2 | 9/2007 | Mody et al. | |
| 7,272,162 B2 | 9/2007 | Sano et al. | |
| 7,274,734 B2 | 9/2007 | Tsatsanis | |

(56) References Cited

U.S. PATENT DOCUMENTS

| | | | |
|---|---|---|---|
| 7,277,679 B1 | 10/2007 | Barratt et al. | |
| 7,280,467 B2 | 10/2007 | Smee et al. | |
| 7,280,625 B2 | 10/2007 | Ketchum et al. | |
| 7,283,508 B2 | 10/2007 | Choi et al. | |
| 7,283,581 B2 | 10/2007 | Itoh | |
| 7,289,570 B2 | 10/2007 | Schmidl et al. | |
| 7,292,854 B2 | 11/2007 | Das et al. | |
| 7,298,778 B2 | 11/2007 | Visoz et al. | |
| 7,298,805 B2 | 11/2007 | Walton et al. | |
| 7,308,035 B2 | 12/2007 | Rouquette et al. | |
| 7,310,304 B2 | 12/2007 | Mody et al. | |
| 7,317,750 B2 | 1/2008 | Shattil | |
| 7,324,429 B2 | 1/2008 | Walton et al. | |
| 7,327,800 B2 | 2/2008 | Oprea et al. | |
| 7,333,556 B2 | 2/2008 | Maltsev et al. | |
| 7,342,912 B1 | 3/2008 | Kerr et al. | |
| 7,356,004 B2 | 4/2008 | Yano et al. | |
| 7,356,089 B2 | 4/2008 | Jia et al. | |
| 7,379,492 B2 | 5/2008 | Hwang | |
| 7,386,076 B2 | 6/2008 | Onggosanusi et al. | |
| 7,392,014 B2 | 6/2008 | Baker et al. | |
| 7,403,748 B1 | 7/2008 | Keskitalo et al. | |
| 7,421,039 B2 | 9/2008 | Malaender et al. | |
| 7,453,844 B1 | 11/2008 | Lee et al. | |
| 7,466,749 B2 | 12/2008 | Medvedev et al. | |
| 7,480,278 B2 | 1/2009 | Pedersen et al. | |
| 7,486,740 B2 | 2/2009 | Inanoglu | |
| 7,492,737 B1 | 2/2009 | Fong et al. | |
| 7,508,748 B2 | 3/2009 | Kadous | |
| 7,548,506 B2 | 6/2009 | Ma et al. | |
| 7,551,546 B2 | 6/2009 | Ma et al. | |
| 7,551,580 B2 | 6/2009 | Du Crest et al. | |
| 7,573,805 B2 | 8/2009 | Zhuang et al. | |
| 7,599,443 B2 | 10/2009 | Ionescu et al. | |
| 7,603,141 B2 | 10/2009 | Dravida | |
| 7,606,296 B1 | 10/2009 | Hsu et al. | |
| 7,606,319 B2 | 10/2009 | Zhang et al. | |
| 7,616,698 B2 | 11/2009 | Sun et al. | |
| 7,623,871 B2 | 11/2009 | Sheynblat | |
| 7,636,573 B2 | 12/2009 | Walton et al. | |
| 7,646,747 B2 | 1/2010 | Atarashi et al. | |
| 7,653,142 B2 | 1/2010 | Ketchum et al. | |
| 7,653,415 B2 | 1/2010 | Van Rooyen | |
| 7,656,967 B2 | 2/2010 | Tiirola et al. | |
| 7,778,337 B2 | 8/2010 | Tong et al. | |
| 7,787,514 B2 | 8/2010 | Shattil et al. | |
| 7,822,140 B2 | 10/2010 | Catreux et al. | |
| 7,843,972 B2 | 11/2010 | Nakahara et al. | |
| 7,885,228 B2 | 2/2011 | Walton et al. | |
| 7,986,742 B2 | 7/2011 | Ketchum et al. | |
| 8,134,976 B2 | 3/2012 | Wallace et al. | |
| 8,145,179 B2 | 3/2012 | Walton et al. | |
| 8,169,944 B2 | 5/2012 | Walton et al. | |
| 8,170,513 B2 | 5/2012 | Walton et al. | |
| 8,194,770 B2 | 6/2012 | Medvedev et al. | |
| 8,203,978 B2 | 6/2012 | Walton et al. | |
| 8,208,364 B2 | 6/2012 | Walton et al. | |
| 8,213,292 B2 | 7/2012 | Ma et al. | |
| 8,218,609 B2 | 7/2012 | Walton et al. | |
| 8,254,246 B2 | 8/2012 | Ma et al. | |
| 8,260,210 B2 | 9/2012 | Esteve et al. | |
| 8,320,301 B2 | 11/2012 | Walton et al. | |
| 8,325,836 B2 | 12/2012 | Tong et al. | |
| 8,355,313 B2 | 1/2013 | Walton et al. | |
| 8,358,714 B2 | 1/2013 | Walton et al. | |
| 8,406,118 B2 | 3/2013 | Ma et al. | |
| 8,462,643 B2 | 6/2013 | Walton et al. | |
| 8,483,188 B2 | 7/2013 | Walton et al. | |
| 8,570,988 B2 | 10/2013 | Wallace et al. | |
| 8,711,763 B2 | 4/2014 | Walton et al. | |
| 8,750,151 B2 | 6/2014 | Wallace et al. | |
| 8,855,226 B2 | 10/2014 | Medvedev et al. | |
| 8,873,365 B2 | 10/2014 | Walton et al. | |
| 8,913,529 B2 | 12/2014 | Walton et al. | |
| 8,934,329 B2 | 1/2015 | Walton et al. | |
| 9,013,974 B2 | 4/2015 | Walton et al. | |
| 9,031,097 B2 | 5/2015 | Walton et al. | |
| 9,048,892 B2 | 6/2015 | Walton et al. | |
| 9,154,274 B2 | 10/2015 | Walton et al. | |
| 9,240,871 B2 | 1/2016 | Walton et al. | |
| 9,312,935 B2 | 4/2016 | Ketchum et al. | |
| 9,473,269 B2 * | 10/2016 | Walton | H04B 7/2643 |
| 9,876,609 B2 * | 1/2018 | Walton | H04B 7/2643 |
| 2001/0017881 A1 | 8/2001 | Bhatoolaul et al. | |
| 2001/0031621 A1 * | 10/2001 | Schmutz | H04B 7/155 455/7 |
| 2001/0033623 A1 | 10/2001 | Hosur | |
| 2001/0046205 A1 | 11/2001 | Easton et al. | |
| 2002/0003774 A1 | 1/2002 | Wang et al. | |
| 2002/0004920 A1 | 1/2002 | Cho et al. | |
| 2002/0018310 A1 | 2/2002 | Hung | |
| 2002/0018453 A1 | 2/2002 | Yu et al. | |
| 2002/0027951 A1 | 3/2002 | Gormley et al. | |
| 2002/0041632 A1 | 4/2002 | Sato et al. | |
| 2002/0044591 A1 | 4/2002 | Lee et al. | |
| 2002/0044610 A1 | 4/2002 | Jones | |
| 2002/0057659 A1 | 5/2002 | Ozluturk et al. | |
| 2002/0062472 A1 | 5/2002 | Medlock et al. | |
| 2002/0064214 A1 | 5/2002 | Hattori et al. | |
| 2002/0075830 A1 | 6/2002 | Hartman, Jr. | |
| 2002/0085620 A1 | 7/2002 | Mesecher | |
| 2002/0085641 A1 | 7/2002 | Baum | |
| 2002/0098872 A1 | 7/2002 | Judson | |
| 2002/0105928 A1 | 8/2002 | Kapoor et al. | |
| 2002/0115467 A1 | 8/2002 | Hamabe | |
| 2002/0115473 A1 | 8/2002 | Hwang et al. | |
| 2002/0122381 A1 | 9/2002 | Wu et al. | |
| 2002/0122393 A1 | 9/2002 | Caldwell et al. | |
| 2002/0136271 A1 | 9/2002 | Hiramatsu et al. | |
| 2002/0147032 A1 | 10/2002 | Yoon et al. | |
| 2002/0150182 A1 | 10/2002 | Dogan et al. | |
| 2002/0154705 A1 | 10/2002 | Walton et al. | |
| 2002/0177447 A1 | 11/2002 | Walton et al. | |
| 2002/0183010 A1 | 12/2002 | Catreux et al. | |
| 2002/0184453 A1 | 12/2002 | Hughes et al. | |
| 2002/0191535 A1 | 12/2002 | Sugiyama et al. | |
| 2002/0193146 A1 | 12/2002 | Wallace et al. | |
| 2002/0196842 A1 | 12/2002 | Onggosanusi et al. | |
| 2003/0002450 A1 | 1/2003 | Jalali et al. | |
| 2003/0007463 A1 | 1/2003 | Li et al. | |
| 2003/0012308 A1 | 1/2003 | Sampath et al. | |
| 2003/0039217 A1 | 2/2003 | Seo et al. | |
| 2003/0039317 A1 | 2/2003 | Taylor et al. | |
| 2003/0045288 A1 | 3/2003 | Luschi et al. | |
| 2003/0045318 A1 | 3/2003 | Subrahmanya | |
| 2003/0048856 A1 | 3/2003 | Ketchum et al. | |
| 2003/0050069 A1 | 3/2003 | Kogiantis et al. | |
| 2003/0072395 A1 | 4/2003 | Jia et al. | |
| 2003/0073409 A1 | 4/2003 | Nobukiyo et al. | |
| 2003/0076812 A1 | 4/2003 | Benedittis | |
| 2003/0078024 A1 | 4/2003 | Magee et al. | |
| 2003/0095197 A1 | 5/2003 | Wheeler et al. | |
| 2003/0099306 A1 | 5/2003 | Nilsson et al. | |
| 2003/0103584 A1 | 6/2003 | Bjerke et al. | |
| 2003/0112745 A1 | 6/2003 | Zhuang et al. | |
| 2003/0117989 A1 | 6/2003 | Kim | |
| 2003/0119452 A1 | 6/2003 | Kim et al. | |
| 2003/0123389 A1 | 7/2003 | Russell et al. | |
| 2003/0125040 A1 | 7/2003 | Walton et al. | |
| 2003/0128656 A1 | 7/2003 | Scarpa | |
| 2003/0139194 A1 | 7/2003 | Onggosanusi et al. | |
| 2003/0142732 A1 | 7/2003 | Moshavi et al. | |
| 2003/0153345 A1 | 8/2003 | Cramer et al. | |
| 2003/0153360 A1 | 8/2003 | Burke et al. | |
| 2003/0162519 A1 | 8/2003 | Smith et al. | |
| 2003/0174676 A1 | 9/2003 | Willenegger et al. | |
| 2003/0174686 A1 | 9/2003 | Willenegger et al. | |
| 2003/0185311 A1 | 10/2003 | Kim | |
| 2003/0186650 A1 | 10/2003 | Liu | |
| 2003/0190897 A1 | 10/2003 | Lei et al. | |
| 2003/0202492 A1 | 10/2003 | Akella et al. | |
| 2003/0202612 A1 | 10/2003 | Halder et al. | |
| 2003/0206558 A1 | 11/2003 | Parkkinen et al. | |

(56) References Cited

U.S. PATENT DOCUMENTS

| | | |
|---|---|---|
| 2003/0207696 A1* | 11/2003 | Willenegger ..... H03M 13/2707 455/522 |
| 2003/0210668 A1 | 11/2003 | Malladi et al. |
| 2003/0235149 A1 | 12/2003 | Chan et al. |
| 2003/0235255 A1 | 12/2003 | Ketchum et al. |
| 2004/0005887 A1 | 1/2004 | Bahrenburg et al. |
| 2004/0013103 A1 | 1/2004 | Zhang et al. |
| 2004/0017785 A1 | 1/2004 | Zelst |
| 2004/0037257 A1 | 2/2004 | Ngo |
| 2004/0047284 A1 | 3/2004 | Eidson |
| 2004/0052228 A1 | 3/2004 | Tellado et al. |
| 2004/0062192 A1 | 4/2004 | Liu et al. |
| 2004/0066782 A1* | 4/2004 | Nassar ................ H04L 12/2856 370/389 |
| 2004/0071104 A1 | 4/2004 | Boesel et al. |
| 2004/0071107 A1 | 4/2004 | Kats et al. |
| 2004/0076224 A1 | 4/2004 | Onggosanusi et al. |
| 2004/0081131 A1 | 4/2004 | Walton et al. |
| 2004/0121730 A1 | 6/2004 | Kadous et al. |
| 2004/0151108 A1 | 8/2004 | Blasco et al. |
| 2004/0151122 A1 | 8/2004 | Lau et al. |
| 2004/0160921 A1 | 8/2004 | Kaipainen et al. |
| 2004/0160987 A1 | 8/2004 | Sudo et al. |
| 2004/0176097 A1* | 9/2004 | Wilson ................ H04B 7/0413 455/452.2 |
| 2004/0198276 A1 | 10/2004 | Tellado et al. |
| 2004/0252632 A1 | 12/2004 | Bourdoux et al. |
| 2005/0002326 A1 | 1/2005 | Ling et al. |
| 2005/0047384 A1 | 3/2005 | Wax et al. |
| 2005/0047515 A1 | 3/2005 | Walton et al. |
| 2005/0099974 A1 | 5/2005 | Kats et al. |
| 2005/0135284 A1 | 6/2005 | Nanda et al. |
| 2005/0135295 A1 | 6/2005 | Walton et al. |
| 2005/0135308 A1 | 6/2005 | Vijayan et al. |
| 2005/0135318 A1 | 6/2005 | Walton et al. |
| 2005/0147177 A1 | 7/2005 | Seo et al. |
| 2005/0174981 A1 | 8/2005 | Heath, Jr. et al. |
| 2005/0185575 A1 | 8/2005 | Hansen et al. |
| 2005/0195915 A1 | 9/2005 | Raleigh et al. |
| 2005/0208959 A1 | 9/2005 | Chen et al. |
| 2005/0220211 A1 | 10/2005 | Shim et al. |
| 2005/0245264 A1 | 11/2005 | Laroia et al. |
| 2005/0276343 A1 | 12/2005 | Jones |
| 2006/0018247 A1 | 1/2006 | Driesen et al. |
| 2006/0018395 A1 | 1/2006 | Tzannes |
| 2006/0067417 A1 | 3/2006 | Park et al. |
| 2006/0072649 A1 | 4/2006 | Chang et al. |
| 2006/0077935 A1 | 4/2006 | Hamalainen et al. |
| 2006/0104196 A1 | 5/2006 | Wu et al. |
| 2006/0104340 A1 | 5/2006 | Walton et al. |
| 2006/0114858 A1 | 6/2006 | Walton et al. |
| 2006/0153237 A1 | 7/2006 | Hwang et al. |
| 2006/0159120 A1 | 7/2006 | Kim |
| 2006/0176968 A1 | 8/2006 | Keaney et al. |
| 2006/0183497 A1 | 8/2006 | Paranchych et al. |
| 2006/0209894 A1 | 9/2006 | Tzannes et al. |
| 2006/0209937 A1 | 9/2006 | Tanaka et al. |
| 2007/0177681 A1 | 8/2007 | Choi et al. |
| 2007/0274278 A1 | 11/2007 | Choi et al. |
| 2009/0161613 A1 | 6/2009 | Kent et al. |
| 2009/0291642 A1 | 11/2009 | Cozzo et al. |
| 2010/0067401 A1 | 3/2010 | Medvedev et al. |
| 2010/0142636 A1 | 6/2010 | Heath, Jr. et al. |
| 2010/0183088 A1 | 7/2010 | Inanoglu |
| 2010/0220825 A1 | 9/2010 | Dubuc et al. |
| 2010/0260060 A1 | 10/2010 | Abraham et al. |
| 2010/0271930 A1 | 10/2010 | Tong et al. |
| 2011/0096751 A1 | 4/2011 | Ma et al. |
| 2012/0134435 A1 | 5/2012 | Kapoor et al. |
| 2012/0219093 A1 | 8/2012 | Jia et al. |
| 2013/0040682 A1 | 2/2013 | Chang et al. |
| 2014/0036823 A1 | 2/2014 | Ma et al. |
| 2015/0365147 A1 | 12/2015 | Ketchum et al. |
| 2016/0270049 A1* | 9/2016 | Walton ................ H04B 7/2643 |
| 2018/0227021 A1 | 8/2018 | Ketchum et al. |

FOREIGN PATENT DOCUMENTS

| | | |
|---|---|---|
| CN | 1086061 | 4/1994 |
| CN | 1234661 | 11/1999 |
| CN | 1298266 A | 6/2001 |
| CN | 1308794 A | 8/2001 |
| CN | 1314037 A | 9/2001 |
| CN | 1325198 A | 12/2001 |
| CN | 1325243 A | 12/2001 |
| CN | 1339885 A | 3/2002 |
| CN | 1347609 A | 5/2002 |
| CN | 1354610 A | 6/2002 |
| CN | 1408150 A | 4/2003 |
| CN | 1469662 | 1/2004 |
| CN | 1489836 A | 4/2004 |
| CN | 1537371 | 10/2004 |
| DE | 19951525 A1 | 6/2001 |
| EP | 0755090 A1 | 1/1997 |
| EP | 0762701 | 3/1997 |
| EP | 0772329 | 5/1997 |
| EP | 0805568 A1 | 11/1997 |
| EP | 0869647 A2 | 10/1998 |
| EP | 0895387 A1 | 2/1999 |
| EP | 0929172 A1 | 7/1999 |
| EP | 0951091 A2 | 10/1999 |
| EP | 0991221 A2 | 4/2000 |
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1126673 A2 | 8/2001 |
| EP | 1133070 | 9/2001 |
| EP | 1137217 | 9/2001 |
| EP | 1143754 A1 | 10/2001 |
| EP | 1170879 A1 | 1/2002 |
| EP | 1175022 A2 | 1/2002 |
| EP | 1182799 A2 | 2/2002 |
| EP | 1185001 A2 | 3/2002 |
| EP | 1185015 | 3/2002 |
| EP | 1185048 A2 | 3/2002 |
| EP | 1207635 A1 | 5/2002 |
| EP | 1207645 A1 | 5/2002 |
| EP | 1223702 A1 | 7/2002 |
| EP | 1241824 | 9/2002 |
| EP | 1265411 | 12/2002 |
| EP | 1315311 A1 | 5/2003 |
| EP | 1379020 | 1/2004 |
| EP | 1387545 | 2/2004 |
| EP | 1416688 A1 | 5/2004 |
| EP | 1447934 A1 | 8/2004 |
| GB | 2300337 | 10/1996 |
| GB | 2373973 A | 10/2002 |
| JP | 1132027 | 5/1989 |
| JP | 03104430 | 5/1991 |
| JP | 06003956 | 1/1994 |
| JP | 6501139 T | 1/1994 |
| JP | 8274756 A | 10/1996 |
| JP | 9135230 | 5/1997 |
| JP | 9266466 | 10/1997 |
| JP | 9307526 A | 11/1997 |
| JP | 09327073 | 12/1997 |
| JP | 9512156 | 12/1997 |
| JP | 10028077 | 1/1998 |
| JP | 10051402 A | 2/1998 |
| JP | 10084324 | 3/1998 |
| JP | 10209956 A | 8/1998 |
| JP | 10303794 A | 11/1998 |
| JP | 10327126 | 12/1998 |
| JP | 1141159 | 2/1999 |
| JP | 11069431 A | 3/1999 |
| JP | 11074863 A | 3/1999 |
| JP | 11163823 A | 6/1999 |
| JP | 11205273 | 7/1999 |
| JP | 11252037 A | 9/1999 |
| JP | 11317723 A | 11/1999 |
| JP | 2991167 | 12/1999 |
| JP | 2000068975 A | 3/2000 |
| JP | 2000078105 | 3/2000 |

(56) References Cited

FOREIGN PATENT DOCUMENTS

| | | |
|---|---|---|
| JP | 2000092009 A | 3/2000 |
| JP | 2001044930 A | 2/2001 |
| JP | 2001086045 A | 3/2001 |
| JP | 2001103034 A | 4/2001 |
| JP | 2001186051 A | 7/2001 |
| JP | 2001510668 A | 7/2001 |
| JP | 2001217896 | 8/2001 |
| JP | 2001231074 | 8/2001 |
| JP | 2001237751 A | 8/2001 |
| JP | 200264879 | 2/2002 |
| JP | 2002504283 | 2/2002 |
| JP | 200277098 | 3/2002 |
| JP | 200277104 | 3/2002 |
| JP | 2002111627 | 4/2002 |
| JP | 2002118534 A | 4/2002 |
| JP | 2002510932 A | 4/2002 |
| JP | 2002514033 A | 5/2002 |
| JP | 2002164814 | 6/2002 |
| JP | 2002176379 A | 6/2002 |
| JP | 2002204217 | 7/2002 |
| JP | 2002232943 A | 8/2002 |
| JP | 2003504941 | 2/2003 |
| JP | 2003198442 A | 7/2003 |
| JP | 2004266586 | 9/2004 |
| JP | 2004297172 | 10/2004 |
| KR | 200011799 | 2/2000 |
| KR | 20010098861 | 11/2001 |
| KR | 102002000337 | 1/2002 |
| RU | 2015281 C1 | 6/1994 |
| RU | 2134489 | 8/1999 |
| RU | 2141168 C1 | 11/1999 |
| RU | 2146418 C1 | 3/2000 |
| RU | 2152132 | 6/2000 |
| RU | 2158479 C2 | 10/2000 |
| RU | 2168277 | 5/2001 |
| RU | 2168278 C2 | 5/2001 |
| RU | 2197781 C2 | 1/2003 |
| RU | 2201034 C2 | 3/2003 |
| RU | 2335852 C2 | 10/2008 |
| TW | 419912 | 1/2001 |
| TW | 496620 | 7/2002 |
| TW | 503347 | 9/2002 |
| TW | 545006 B | 8/2003 |
| TW | 567689 | 12/2003 |
| TW | 567701 | 12/2003 |
| TW | 583842 B | 4/2004 |
| TW | I263449 | 10/2006 |
| TW | I267251 B | 11/2006 |
| WO | WO-86007223 | 12/1986 |
| WO | WO-1992010890 | 6/1992 |
| WO | WO-9307684 A1 | 4/1993 |
| WO | WO-1995007578 | 3/1995 |
| WO | WO-9516319 A1 | 6/1995 |
| WO | WO-9521501 A1 | 8/1995 |
| WO | WO-9530316 A1 | 11/1995 |
| WO | WO-9532567 A1 | 11/1995 |
| WO | WO-1996010873 | 4/1996 |
| WO | WO-96022662 | 7/1996 |
| WO | WO-1996035268 | 11/1996 |
| WO | WO-199702667 | 1/1997 |
| WO | WO-9719525 A1 | 5/1997 |
| WO | WO-9736377 A1 | 10/1997 |
| WO | WO-9809381 A1 | 3/1998 |
| WO | WO-199809395 | 3/1998 |
| WO | WO-9824192 A1 | 6/1998 |
| WO | WO-98026523 | 6/1998 |
| WO | WO-98030047 A1 | 7/1998 |
| WO | WO-9857472 | 12/1998 |
| WO | WO-9903224 | 1/1999 |
| WO | WO-1999014878 | 3/1999 |
| WO | WO-99016214 | 4/1999 |
| WO | WO-9929049 A2 | 6/1999 |
| WO | WO-9944379 A1 | 9/1999 |
| WO | WO-9952224 A1 | 10/1999 |
| WO | WO-9957820 A1 | 11/1999 |
| WO | WO-0011823 A1 | 3/2000 |
| WO | WO-0036764 A2 | 6/2000 |
| WO | WO-0062456 A1 | 10/2000 |
| WO | WO-0105067 A1 | 1/2001 |
| WO | WO-0126269 A1 | 4/2001 |
| WO | WO-0163775 A2 | 8/2001 |
| WO | WO-0169801 A2 | 9/2001 |
| WO | WO-2001071928 | 9/2001 |
| WO | WO-0180510 A1 | 10/2001 |
| WO | WO-2001076098 | 10/2001 |
| WO | WO-2001076110 | 10/2001 |
| WO | WO-2001082521 | 11/2001 |
| WO | WO-0195531 A2 | 12/2001 |
| WO | WO-2001097400 | 12/2001 |
| WO | WO-0201732 A2 | 1/2002 |
| WO | WO-0203557 A1 | 1/2002 |
| WO | WO-2002005506 | 1/2002 |
| WO | WO-0215433 A1 | 2/2002 |
| WO | WO-0225853 A2 | 3/2002 |
| WO | WO-0245293 A2 | 6/2002 |
| WO | WO-2002060138 | 8/2002 |
| WO | WO-2002062002 | 8/2002 |
| WO | WO-2002065664 | 8/2002 |
| WO | WO-02069523 A1 | 9/2002 |
| WO | WO-02073869 A1 | 9/2002 |
| WO | WO-2002069590 | 9/2002 |
| WO | WO-2002075955 | 9/2002 |
| WO | WO-02078211 A2 | 10/2002 |
| WO | WO-02082689 A2 | 10/2002 |
| WO | WO-2002078211 A2 | 10/2002 |
| WO | WO-02088656 | 11/2002 |
| WO | WO-2002093784 | 11/2002 |
| WO | WO-02099992 | 12/2002 |
| WO | WO-03010984 A1 | 2/2003 |
| WO | WO-03010994 A1 | 2/2003 |
| WO | WO-03019984 A1 | 3/2003 |
| WO | WO-03028153 | 4/2003 |
| WO | WO-03034646 A2 | 4/2003 |
| WO | WO-03041330 | 5/2003 |
| WO | WO-03047140 A1 | 6/2003 |
| WO | WO-03075479 A1 | 9/2003 |
| WO | WO-04002047 | 12/2003 |
| WO | WO-2004002011 A1 | 12/2003 |
| WO | WO-2004021605 A1 | 3/2004 |
| WO | WO-04038952 | 5/2004 |
| WO | WO-6615024 | 5/2004 |
| WO | WO-2004038985 A2 | 5/2004 |
| WO | WO-2004038986 A2 | 5/2004 |
| WO | WO-2004038988 A2 | 5/2004 |
| WO | WO-2004038989 A2 | 5/2004 |
| WO | WO-2004039011 A2 | 5/2004 |
| WO | WO-2004039022 A2 | 5/2004 |
| WO | WO-05043855 | 5/2005 |
| WO | WO-2005041515 A1 | 5/2005 |
| WO | WO-2005046113 A2 | 5/2005 |
| WO | WO-2005055527 A1 | 6/2005 |

OTHER PUBLICATIONS

3GPP2 TIA/EIA/IS-2000.2-A, "Physical Layer Standard for cdma2000: Standards for Spread Spectrum Systems," (Mar. 2000), Telecommunications Industry Association, pp. 1-446.
3rd Generation Partnership Project ; Technical Specification Group Radio Access Network; Radio Resource Control (RRC); Protocol Specification (Release 5 ), 3GPP Standard; 3GPP TS 25.331, 3rd Generation Partnership Project (3GPP), Mobile Competence Centre; 650, Route Des Lucioles ; F-06921 Sophia-Antipolis Cedex; France, No. V5.2.0, Sep. 1, 2002 (Sep. 1, 2002), pp. 1-938, XP050367950, pp. 124, 358—p. 370.
"3rd Generation Partnership Project ; Technical Specification Group Radio Access 6-18, Network; Physical channels and mapping of 21-24 transport channels onto physical channels (TDD) (Release 5)", 3GPP Standard; 3GPP TS 25.221, 3rd Generation Partnership Project (3GPP), Mobile Competence Centre ; 650, Route Des Lucioles ; F-06921 Sophia-Antipolis Cedex ; France, No. V5.2.0, Sep. 1, 2002 (Sep. 1, 2002), pp. 1-97, XP050366967.

(56) References Cited

OTHER PUBLICATIONS

Alamouti, S.M., "A Simple Transmit Diversity Technique for Wireless Communications," IEEE Journal on Select Areas in Communications, vol. 16, No. 8, Oct. 1998, pp. 1451-1458.
Bingham J.A.C., "Multicarrier modulation for data transmission: An idea whose time has come," Communications Magazine, IEEE, , vol. 28, Issue 5, pp. 5-14 (May 1990).
Catreux S., et al., "Simulation results for an interference-limited multiple input multiple output cellular system"., Global Telecommunications letters . IEEE: U.S.A. Nov. 2000. vol. 4(11), pp. 334-336.
Chen, K.C. et al., "Novel Space-Time Processing of DS/CDMA Multipath Signal," IEEE 49th, Vehicular Technology Conference, Houston, Texas, May 16-20, 1999, pp. 1809-1813.
Choi, R. et al., "MIMO Transmit Optimization for Wireless Communication Systems," Proceedings of the First IEEE International workshops on Electronic Design, pp. 1-6, Piscataway, New Jersey, Jan. 29-31, 2002.
Chung, J. et al: "Multiple antenna systems for 802.16 systems." IEEE 802.16 Broadband Wireless Access Working Group< http://ieee802.org/l6>, IEEE 802.16abc-01/31, Sep. 7, 2001, pp. 1-5.
Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.
Co-pending U.S. Appl. No. 07/624,118, filed Dec. 7, 1990.
Co-pending U.S. Appl. No. 08/118,473, filed Sep. 8, 1993.
Co-pending U.S. Appl. No. 60/421,309, filed Oct. 25, 2002.
Co-pending U.S. Appl. No. 60/421,428, filed Oct. 25, 2002.
Deneire, Luc, et al.: "A Low Complexity ML Channel Estimator for OFDM," Proc IEEE ICC (Jun. 2001), pp. 1461-1465.
Diggavi, S. et al., "Intercarrier interference in MIMO OFDM," IEEE International Conference on Communications, (Aug. 2002), vol. 1, pp. 485-489, doi: 10.1109/ICC.2002.996901.
Editor: 3GPP Draft; 3rd Generation Partnership Project (3GPP), Technical Specification Group (TSG) Radio Access Network (RAN); Working Group 4(WG4); base Station conformance and testing", TS 25.141 V0.1.1 (May 1999)", R4-99349, Mobile Competence Centre; 650, Route Des Lucioles; F-06921 Sophia-Antipolis Cedex; France, vol. RAN WG4, no.Miami; Oct. 24, 2001, Oct. 24, 2001 (Oct. 24, 2001), XP050166323.
ETSI TS 101 761-1 v1.3.1, "Broadband Radio Access Networks (BRAN); HIPERLAN Type 2; Data Link Control (DLC) Layer; Part 1: Basic Data Transport Functions," ETSI Standards, European Telecommunications Standards Institute BR (V131), pp. 1-88 (Dec. 2001).
Fujii, M.: "Pseudo-Orthogonal Multibeam-Time Transmit Diversity for OFDM-CDMA" pp. 222-226 (2002).
G. Bauch, J. Hagenauer, "Smart Versus Dumb Antennas—Capacities and FEC Performance," IEEE Communications Letters, vol. 6, No. 2, pp. 55-57, Feb. 2002.
Gao, J. et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, (Sep. 24-28, 2002), IEEE Vehicular Technology Conference, pp. 199-203.
Gore, D. A., et al.: "Selecting an optimal set of transmit antennas for a low rank matrix channel," 2000 IEEE International Conference on Acoustics, Speech, and Signal Processing. Proceedings. (ICASSP). Istanbul, Turkey, Jun. 5-9, 2000, New York, NY; IEEE, US, vol. 5 of 6, (Jun. 5, 2000), pp. 2785-2788, XP001035763, abstract.
Grunheid, R. et al., "Adaptive Modulation and Multiple Access for the OFDM Transmission Technique," Wireless Personal Communications 13: May 13, 2000, 2000 Kluwer Academic Publishers, pp. 4-13, XP000894156.
Harada H., et al., "An OFDM-Based Wireless ATM Transmission System Assisted by a Cyclically ExtendedPN Sequence for Future Broad-BandMobile Multimedia Communications", IEEE Transactions on Vehicular Technology, IEEE Service Center, Piscataway, NJ, US, vol. 50, No. 6, Nov. 1, 2001, XP011064321, ISSN: 0018-9545.
Hassibi, B. et al., "High Rate Codes That are Linear in Space and Time," Lucent Technologies, 2002, pp. 1-55.
Haustein, T. et al.: "Performance of MIMO Systems with Channel Inversion," IEEE 55th Vehicular Technology Conference, Birmingham, Alabama, May 6-9, 2002, pp. 35-39.
Hayashi, K. et al.: "A New Spatio-Temporal Equalization Method Based on Estimated Channel Response," Sep. 2001, IEEE Transactions on Vehicular Technology, vol. 50, No. 5, pp. 1250-1259.
Heath et al., "Multiuser diversity for MIMO wireless systems with linear receivers", Conference Record of the 35th Asilomar Conference on Signals, Systems, & Computers, Nov. 4, 2001, pp. 1194-1199, vol. 2, IEEE, XP010582229, DOI: 10.1109/ACSSC.2001.987680, ISBN: 978-0-7803-7147-7.
Hong, D. K. et al.: "Robust Frequency Offset Estimation for Pilot Symbol Assisted Packet CDMA with MIMO Antenna Systems," IEEE Communications Letters, vol. 6, No. 6, pp. 262-264, XP-001133262 (Jun. 2002).
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.
International Search Report for PCT Application No. PCT-US2004-038198,International Search Authority, European Patent Office filed on Apr. 4, 2005.
Iserte, P., et al., "Joint beamforming strategies in OFDM-MIMO systems," Acoustics, Speech, and Signal Processing, 1993. ICASSP-93., 1993 IEEE International Conference on , vol. 3, sections 2-3, Apr. 27-30, 1993, doi: 10.1109/ICASSP.2002.1005279.
Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.
Jongren, G. et al.: "Utilizing Quantized Feedback Information in Orthogonal Space-Time Block Coding," 2000 IEEE Global Telecommunications Conference, 2(4): 995-999, Nov. 27, 2000.
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa M, et al., "Multichannel adaptive forward error-correction system", IEEE Proceedings I. Solid-State & Electron Devices, Institution of Electrical Engineers. Stevenage, GB, vol. 140, No. 5, Part 1, Oct. 1, 1993 (Oct. 1, 1993), pp. 357-364, XP000403498, ISSN: 0956-3776.
Lal D et al: "A novel Mac layer protocol for space division multiple access in wireless ad hoc networks", Computer Communications and Networks, 2002 Proceedings, Eleventh International Conference on Oct. 14, 2002 (Oct. 14, 2002), pp. 614-619.
Le Goff, S. et al: "Turbo-codes and high spectral efficiency modulation," IEEE International Conference on Communications, 1994. ICC "94, Supercomm/ICC "94, Conference Record, 'Serving Humanity Through Communications.' pp. 645-649, vol. 2, May 1-5, 1994, XP010126658, doi: 10.1109/ICC.1994.368804.
Lebrun G., et al., "MIMO transmission over a time varying TDD channel using SVD," Electronics Letters, 2001, vol. 37, pp. 1363-1364.
Li, Lihua, et al., "A practical space-frequency block coded OFDM scheme for fast fading broadband channels," 2002. The 13th IEEE International Symposium on Personal, Indoor and Mobile Radio communications, vol. 1, Sep. 15-18, 2002.pp. 212-216 vol. 1.
Li, Ye et. al., "Simplified Channel Estimation for OFDM Systems with Multiple Transmit Antennas," IEEE Transactions on Wireless Communications, Jan. 2002, vol. 1, No. 1, pp. 67-75.
Louvigne J.C., et al., "Experimental study of a real-time calibration procedure of a CDMA/TDD multiple antenna terminal," IEEE Antennas and Propagation Society International Symposium, 2002 Digest.APS.San Antonio, TX, Jun. 16-21, 2002,vol. 2, Jun. 16, 2002, pp. 644-647, XP010591780, DOI: 10.1109/APS.2002.1016729, ISBN: 978-0-7803-7330-3.

(56) References Cited

OTHER PUBLICATIONS

Miyashita, K. et al: "High data-rate transmission with eigenbeam-space division multiplexing (E-SDM) in a MIMO channel," VTC 2002-Fall. 2002 IEEE 56th. Vehicular Technology Conference Proceedings. Vancouver, Canada, Sep. 24-28, 2002, IEEE Vehicular Technology Conference, New York, NY: IEEE, US, vol. vol. 1 of 4. Conf. 56, (Sep. 24, 2002), pp. 1302-1306, XP010608639.

Nogueroles R., et al., "Performance of a random OFDMA system for mobile communications", Broadband Communications, 1998. Accessing, Transmission, Networking. Proceedings. 1998 International Zurich Seminar on Zurich, Switzerland Feb. 17-19, 1998, New York, NY, USA, IEEE, US, Feb. 17, 1998 (Feb. 17, 1998), pp. 37-43, XP010277032, DOI : 10.1109/IZSBC.1998.670242 ISBN: 978-07803-3893-7, p. 1-p. 2.

Pautler, J. et al.: "On Application of Multiple-Input Multiple-Output Antennas to CDMA Cellular Systems," IEEE 54th Vehicular Technology Conference Proceedings, Atlantic City, New Jersey, Oct. 7-11, 2001, pp. 1508-1512.

Sakaguchi et al, "Comprehensive Calibration for MIMO System", International Symposium on Wireless Personal Multimedia Communications, IEEE, vol. 2, Oct. 27, 2002, pp. 440-443.

Sampath et al., "A Fourth-Generation MIMO-OFDM Broadband Wireless System: Design, Performance and Field Trial Results", IEEE Communications Magazine, Sep. 1, 2002, pp. 143-149, vol. 40, No. 9, IEEE Service Center, XP011092922, ISSN: 0163-6804, DOI: 10.1109/MCOM.2002.1031841.

Sampath, H., et al., "Joint transmit and receive optimization for high data rate wireless communication using multiple antennas," Signals, Systems, and Computers, 1999. Conference Record of the Thirty-Third Asilomar Conference, Oct. 24, 1999 (Oct. 24, 1999), XP010373976, pp. 215-219, IEEE, Piscataway, NJ, US.

Song, Bong-Gee et al., "Prefilter design using the singular value decomposition for MIMO equalization," 1996 Conference Record of the Thirtieth Asilomar Conference on Signals, Systems and Computers, vol. 1, pp. 34-38, Nov. 3-6, 1996, XP010231388, DOI: 10.1109/ACSSC.1996.600812, p. 35, col. 2, paragraph 4 through p. 36, col. 1.

Strang Gilbert:. "Linear Algebra and Its Applications," Second Edition, Academic Press, 1980.

Taiwan Search Report—TW093135893—TIPO—dated Jul. 6, 2011.

Tarighat, A. et al. "Performance Analysis of Different Algorithms for cdma2000 Antenna Array System and a New Multi User Beamforming (MUB) Algorithm", Wireless Communications and Networking Conference, vol. 1, pp. 409-414, Sep. 23, 2000.

Technical Search Report issued by the Taiwan Patent Office for TW Application No. 098143050, dated Aug. 2, 2013.

The Authoritative Dictionary of IEEE Standards Terms, Seventh Edition, IEEE Press: New York (Dec. 2000), p. 902.

Theon, S. et al.: "Improved Adaptive Downlink for OFDM/SDMA-Based Wireless Networks," IEEE VTS 53rd Vehicular Technology Conference, pp. 707-711, Rhodes, Greece, May 6-9, 2001.

Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinki, Finland, Jun. 11-14, 2001.

Van Zelst, A. et al.: "Space Division Multiplexing (SDM) for OFDM Systems," IEEE 51st Vehicular Technology Conference Proceedings, pp. 1070-1074, Tokyo, Japan, May 15-18, 2000.

Varanasi M.K, et al., "Optimum decision feedback multiuser equalization with successive decoding achieves the total capacity of the Gaussian multiple-access channel", Signals, Systems & Computers, 1997. Conference Record of the Thirty-First Asilomar Conference on Pacific Grove, CA, USA Nov. 2-5, 1997, Los Alamitos, CA, USA,IEEE Comput. Soc, US, vol. 2, Nov. 2, 1997 (Nov. 2, 1997), pp. 1405-1409, XP010280667, DOI: 10.1109/ACSSC.1997.679134 ISBN : 978-0-8186-8316-9 * pp. 1,3,5; figures 1,3 *.

Vook, F. W. et al., "Adaptive antennas for OFDM", Vehicular Technology Conference, vol. 1, May 18-21, 1998, pp. 606-610, XP010287858, New York, Ny, USA, IEEE, US DOI: 10.1109/VETEC.1998.686646 ISBN: 978-0-7803-4320-7.

Wales, S.W. "A mimo technique within the UTRA TDD standard," MIMO: Communications Systems from Concept to Implementations (Ref. No. 2001/175), IEE Seminar on, (Dec. 12, 2001), pp. 1-8., London, UK.

Warner, W. et al.: "OFDM/FM Frame Synchronization for Mobile Radio Data Communication", IEEE Transactions on Vehicular Technology, Aug. 1993, vol. 42, No. 3, pp. 302-313.

Wolniansky P.W., et al., "V-BLAST: An architecture for realizing very high data rates over the rich-scattering wireless channel," Signals, Systems, and Electronics, 1998. ISSSE 98. 1998 URSI International Symposium, pp. 295-300, (Sep. 29-Oct. 2, 1998), doi: 10.1109/ISSSE.1998.738086.

Wong, et al., "Multiuser OFDM With Adaptive Subcarrier, Bit, and Power Allocation," Oct. 1999, IEEE Journal on Selected Areas in Communications, vol. 17, No. 10, pp. 1747-1758.

Wong K. K., et al., "Optimizing time and space MIMO antenna system for frequency selective fading channels," IEEE Journal on Selected Areas in Communications, vol. 19, No. 7, Jul. 2001, Sections II and III and V, 1396, pp. 1395-1407.

Written Opinion for PCT Application No. PCT-US2004 038198, International Search Authority, European Patent Office filed on Apr. 4, 2005.

Wyglinski, Alexander. "Physical Layer Loading Algorithms for Indoor Wireless Multicarrier Systems," Thesis Paper, McGill University, Montreal, Canada, Nov. 2004, p. 109.

Yamamura, T et al., "High Mobility OFDM transmission system by a new channel estimation and ISI cancellation scheme using characteristics of pilot symbol inserted OFDM signal"., Vehicular Technology Conference, vol. 1, Sep. 19, 1999-Sep. 22, 1999, pp. 319-323, XP010352958 IEEE, Piscataway, NJ, USA, ISBN: 0-7803-5435-4.

Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.

LG Electronics: "Multi-Stream Beamforming (MSB) MIMO System", 3GPP TSG RAN WG1 #32, R1-030581, Paris, France, May 19-23, 2003, pp. 1-10.

Samsung et al., "Per Unitary basis stream User and Rate Control (PU2RC)", 3GPP TSG RAN WG 1 #32, TSGR1#32 R1-030586, Paris, France, May 19-23, 2003, 7 pages.

\* cited by examiner

METHOD AND APPARATUS FOR PROVIDING AN EFFICIENT CONTROL CHANNEL STRUCTURE IN A WIRELESS COMMUNICATION SYSTEM

RELATED APPLICATIONS

This application is a Continuation of U.S. application Ser. No. 15/158,481, filed May 18, 2016, entitled "Method and Apparatus for Providing an Efficient Control Channel Structure in a Wireless Communication System," which is a Continuation of U.S. application Ser. No. 10/725,904, filed Dec. 1, 2003, entitled "Method and Apparatus for Providing an Efficient Control Channel Structure in a Wireless Communication System."

BACKGROUND

I. Field

The present invention relates generally to data communication and processing, and more specifically to a method and apparatus for providing an efficient control channel structure in a wireless local area network (WLAN) communication system.

II. Background

Wireless communication systems have been widely deployed to provide various types of communication such as voice, packet data, and so on. These systems may be multiple-access systems capable of supporting communication with multiple users sequentially or simultaneously by sharing the available system resources. Examples of multiple-access systems include Code Division Multiple Access (CDMA) systems, Time Division Multiple Access (TDMA) systems, and Frequency Division Multiple Access (FDMA) systems.

In recent years, wireless local area networks (WLANs) have also been widely deployed in accordance with various WLAN standards (e.g., IEEE 802.11a, 802.11b, and 802.11g, etc.) to enable communication among wireless electronic devices (e.g., computers) via wireless link. A WLAN may employ devices called access points (or base stations) that act like hubs and/or routers and provide connectivity for other wireless devices in the network (e.g. user terminals or user stations). The access points may also connect (or "bridge") the WLAN to wired LANs, thus allowing the wireless devices access to LAN resources.

In a wireless communication system, a radio frequency (RF) modulated signal from a transmitter unit may reach a receiver unit via a number of propagation paths. The characteristics of the propagation paths typically vary over time due to a number of factors, such as fading and multipath. To provide diversity against deleterious path effects and improve performance, multiple transmit and receive antennas may be used. If the propagation paths between the transmit and receive antennas are linearly independent (e.g., a transmission on one path is not formed as a linear combination of the transmissions on the other paths), then the likelihood of correctly receiving a data transmission increases as the number of antennas increases. Generally, diversity increases and performance improves as the number of transmit and receive antennas increases.

A MIMO system employs multiple (NT) transmit antennas and multiple (NR) receive antennas for data transmission. A MIMO channel formed by the NT transmit and NR receive antennas may be decomposed into NS spatial channels, with $N_S \leq \min\{N_T, N_R\}$ Each of the NS spatial channels corresponds to a dimension. The MIMO system can provide improved performance (e.g., increased transmission capacity and/or greater reliability) if the additional dimensionalities created by the multiple transmit and receive antennas are utilized.

An exemplary MIMO WLAN system is described in the aforementioned U.S. patent application Ser. No. 10/693,419, assigned to the assignee of the present invention. Such a MIMO WLAN system may be configured to provide various types of services and support various types of applications, and achieve a high level of system performance. In various embodiments, MIMO and orthogonal frequency division multiplexing (OFDM) may be employed to attain high throughput, combat deleterious path effects, and provide other benefits. Each access point in the system may be configured to support multiple user terminals. The allocation of downlink and uplink resources may be dependent on the requirements of the user terminals, the channel conditions, and other factors.

In one embodiment, the WLAN system as disclosed in the aforementioned U.S. Patent Application employs a channel structure designed to support efficient downlink and uplink transmissions. Such a channel structure may comprise a number of transport channels that may be used for various functions, such as signaling of system parameters and resource assignments, downlink and uplink data transmissions, random access of the system, and so on. Various attributes of these transport channels may be configurable, which allows the system to easily adapt to changing channel and loading conditions. One of these transport channels, called forward control channel (FCCH), may be used by the access point to allocate resources (e.g., channel assignments) on the downlink and uplink. The FCCH may also be used to provide acknowledgment for messages received on another transport channel.

As disclosed in the aforementioned U.S. Patent Application, in one embodiment, the FCCH can be transmitted or operable at different data rates (e.g., four different data rates). For example, the different data rates may include 0.25 bps/Hz, 0.5 bps/Hz, 1 bps/Hz, and 2 bps/Hz. However, in such a configuration, the rate employed on the FCCH is dictated by the worst case user in the system (i.e., the user that operates at the lowest data rate). This scheme is inefficient because a single user that cannot operate at a higher rate may reduce the efficiency and utilization of the FCCH, even though other users in the system may be able to operate at higher data rates.

There is, therefore, a need in the art for a method and apparatus to provide a more efficient control channel structure that is able to accommodate different users that may operate at different data rates.

SUMMARY

The various aspects and embodiments of the invention are described in further detail below. According to one aspect of the invention, a method is provided in which a control channel used for transmitting control information is partitioned into a plurality of subchannels each of which is operated at a specific data rate. For each of one or more user terminals, one of the subchannels is selected based on one or more selection criteria for transmitting control information from an access point to the respective user terminal. Control information is transmitted from the access point to a user terminal on a particular subchannel selected for the respective user terminal. At the user terminal, one or more sub-channels are decoded to obtain control information designated for the user terminal.

BRIEF DESCRIPTION OF THE DRAWINGS

The various features and aspects of the invention can be understood from the detailed description set forth below in conjunction with the following drawings, in which.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
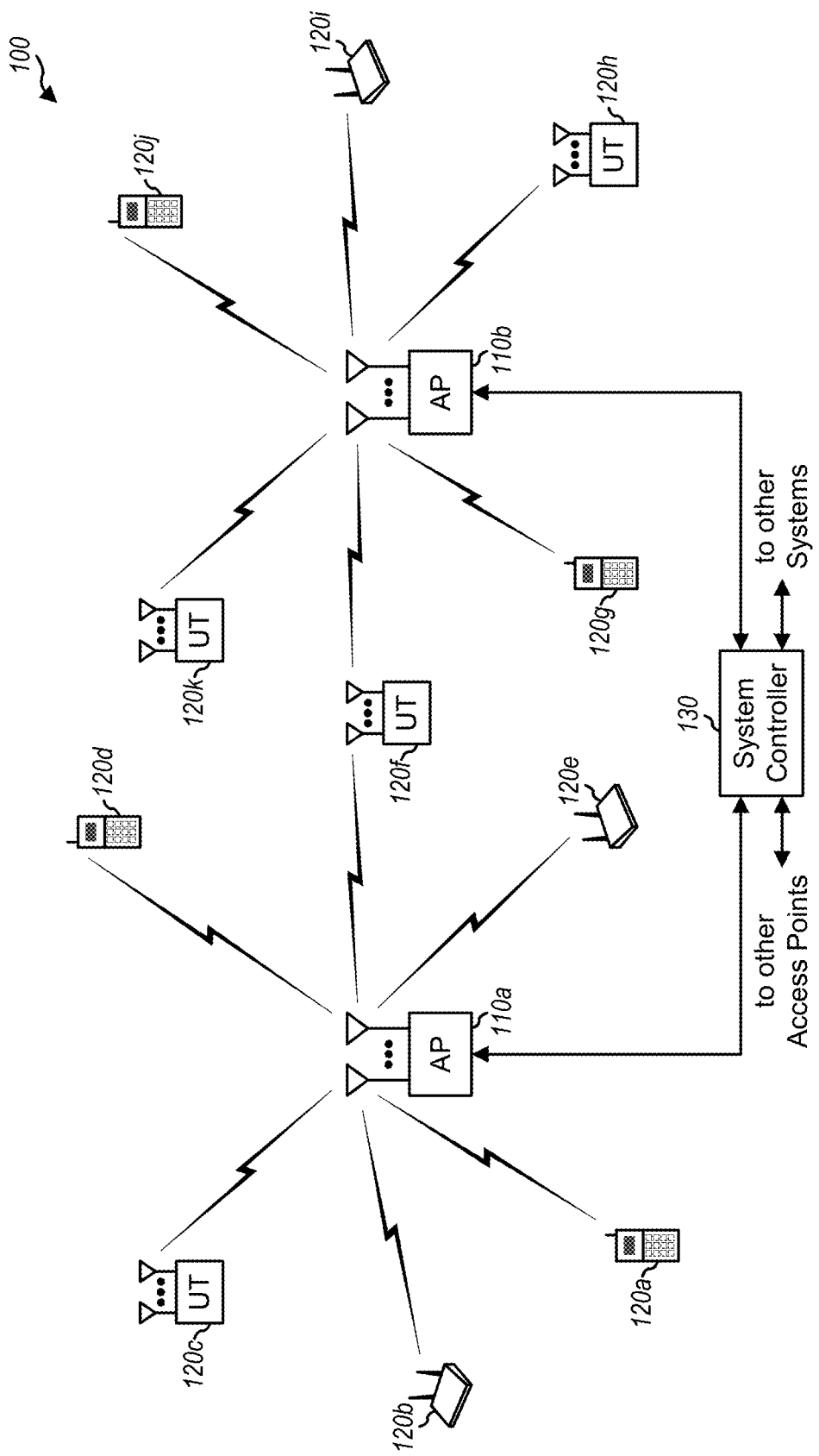
FIG. 1 shows a block diagram of a MIMO WLAN system in which the teachings of the invention are implemented.

FIG. 1 shows a MIMO WLAN system 100 in which the teachings of the present invention are implemented. As shown in FIG. 1, MIMO WLAN system 100 includes a number of access points (APs) 110 that support communication for a number of user terminals (UTs) 120. For simplicity, only two access points 110 are shown in FIG. 1. An access point may also be referred to as a base station, access controller, or communication controller herein.

User terminals 120 may be dispersed throughout the system. Each user terminal may be a fixed or mobile terminal that can communicate with the access point. A user terminal may also be referred to as a mobile station, a remote station, an access terminal, a user equipment (UE), a wireless device, or some other terminology herein. Each user terminal may communicate with one or possibly multiple access points on the downlink and/or uplink at any given moment. The downlink (also called forward link) refers to transmission from the access point to the user terminal, and the uplink (also called reverse link) refers to transmission from the user terminal to the access point.

In FIG. 1, access point 110a communicates with user terminals 120a through 120f, and access point 110b communicates with user terminals 120f through 120k. Depending on the specific design of system 100, an access point may communicate with multiple user terminals simultaneously (e.g., via multiple code channels or subbands) or sequentially (e.g., via multiple time slots). At any given moment, a user terminal may receive downlink transmissions from one or multiple access points. The downlink transmission from each access point may include overhead data intended to be received by multiple user terminals, user-specific data intended to be received by specific user terminals, other types of data, or any combination thereof. The overhead data may include pilot, page and broadcast messages, system parameters, and so on.

In one embodiment, the MIMO WLAN system is based on a centralized controller network architecture. Thus, a system controller 130 couples to access points 110 and may further couple to other systems and networks. For example, system controller 130 may couple to a packet data network (PDN), a wired local area network (LAN), a wide area network (WAN), the Internet, a public switched telephone network (PSTN), a cellular communication network, etc. System controller 130 may be designed to perform a number of functions such as (1) coordination and control for the access points coupled to it, (2) routing of data among these access points, (3) access and control of communication with the user terminals served by these access points, and so on. The MIMO WLAN system as shown in FIG. 1 may be operated in various frequency bands (e.g., the 2.4 GHz and 5.x GHz U-NII bands), subject to the bandwidth and emission constraints specific to the selected operating band.

In one embodiment, each access point may be equipped with multiple transmit and receive antennas (e.g., four transmit and receive antennas) for data transmission and reception. Each user terminal may be equipped with a single transmit/receive antenna or multiple transmit/receive antennas for data transmission and reception. The number of antennas employed by each user terminal type may be dependent on various factors such as, for example, the services to be supported by the user terminal (e.g., voice, data, or both), cost considerations, regulatory constraints, safety issues, and so on.

For a given pairing of multi-antenna access point and multi-antenna user terminal, a MIMO channel is formed by the NT transmit antennas and NR receive antennas available for use for data transmission. Different MIMO channels are formed between the access point and different multi-antenna user terminals. Each MIMO channel may be decomposed into NS spatial channels, with $N_S \leq \min\{N_T, N_R\}$. NS data streams may be transmitted on the NS spatial channels. Spatial processing is required at a receiver and may or may not be performed at a transmitter in order to transmit multiple data streams on the NS spatial channels.

The NS spatial channels may or may not be orthogonal to one another. This depends on various factors such as (1) whether or not spatial processing was performed at the transmitter to obtain orthogonal spatial channels and (2) whether or not the spatial processing at both the transmitter and the receiver was successful in orthogonalizing the spatial channels. If no spatial processing is performed at the transmitter, then the NS spatial channels may be formed with NS transmit antennas and are unlikely to be orthogonal to one another.

The NS spatial channels may be orthogonalized by performing decomposition on a channel response matrix for the MIMO channel, as described in the aforementioned U.S. Patent Application. For a given number of (e.g., four) antennas at the access point, the number of spatial channels available for each user terminal is dependent on the number of antennas employed by that user terminal and the characteristics of the wireless MIMO channel that couples the access point antennas and the user terminal antennas. If a user terminal is equipped with one antenna, then the four antennas at the access point and the single antenna at the user terminal form a multiple-input single-output (MISO) channel for the downlink and a single-input multiple-output (SIMO) channel for the uplink.

The MIMO WLAN system as shown in FIG. 1 may be designed and configured to support various transmission modes, as illustrated in Table 1 below.

TABLE 1

| Transmission modes | Description |
|---|---|
| SIMO | Data is transmitted from a single antenna but may be received by multiple antennas for receive diversity. |
| Diversity | Data is redundantly transmitted from multiple transmit antennas and/or multiple subbands to provide diversity. |
| Beam-steering | Data is transmitted on a single (best) spatial channel at full power using phase steering information for the principal eigenmode of the MIMO channel. |
| Spatial multiplexing | Data is transmitted on multiple spatial channels to achieve higher spectral efficiency. |

The transmission modes available for use for the downlink and uplink for each user terminal are dependent on the number of antennas employed at the user terminal. Table 2 lists the transmission modes available for different terminal types for the downlink and uplink, assuming multiple (e.g., four) antennas at the access point.

TABLE 2

| | Downlink | | Uplink | |
|---|---|---|---|---|
| Transmission modes | Single-antenna user terminal | Multi-antenna user terminal | Single-antenna user terminal | Multi-antenna user terminal |
| MISO (on downlink)/SIMO (on uplink) | X | X | X | X |
| Diversity | | X | X | X |
| Beam-steering | | X | X | X |
| Spatial multiplexing | | X | | X |

In an embodiment, the MIMO WLAN system employs OFDM to effectively partition the overall system bandwidth into a number of ($N_F$) orthogonal subbands. These subbands are also referred to as tones, bins, or frequency channels. With OFDM, each subband is associated with a respective subcarrier that may be modulated with data. For a MIMO system that utilizes OFDM, each spatial channel of each subband may be viewed as an independent transmission channel where the complex gain associated with each subband is effectively constant across the subband bandwidth.

In one embodiment, the system bandwidth can be partitioned into 64 orthogonal subbands (i.e., $N_F=64$), which are assigned indices of −32 to +31. Of these 64 subbands, 48 subbands (e.g., with indices of ±{1, . . . , 6, 8, . . . , 20, 22, . . . , 26}) can be used for data, 4 subbands (e.g., with indices of ±{7, 21}) can be used for pilot and possibly signaling, the DC subband (with index of 0) is not used, and the remaining subbands are also not used and serve as guard subbands. This OFDM subband structure is described in further detail in a document for IEEE Standard 802.11a and entitled "Part 11: Wireless LAN Medium Access Control (MAC) and Physical Layer (PHY) Specifications: High-speed Physical Layer in the 5 GHz Band," September 1999, which is publicly available. In other embodiments, different numbers of subbands and various other OFDM subband structures may also be implemented for the MIMO WLAN system. For example, all 53 subbands with indices from −26 to +26 may be used for data transmission. As another example, a 128-subband structure, a 256-subband structure, or a subband structure with some other number of subbands may be used.

For OFDM, the data to be transmitted on each subband is first modulated (i.e., symbol mapped) using a particular modulation scheme selected for use for that subband. Zeros are provided for the unused subbands. For each symbol period, the modulation symbols and zeros for all NF subbands are transformed to the time domain using an inverse fast Fourier transform (IFFT) to obtain a transformed symbol that contains NF time-domain samples. The duration of each transformed symbol is inversely related to the bandwidth of each subband. In one specific design for the MIMO WLAN system, the system bandwidth is 20 MHz, $N_F=64$, the bandwidth of each subband is 312.5 KHz, and the duration of each transformed symbol is 3.2 μsec.

OFDM can provide certain advantages, such as the ability to combat frequency selective fading, which is characterized by different channel gains at different frequencies of the overall system bandwidth. It is well known that frequency selective fading causes inter-symbol interference (ISI), which is a phenomenon whereby each symbol in a received signal acts as distortion to subsequent symbols in the received signal. The ISI distortion degrades performance by impacting the ability to correctly detect the received symbols. Frequency selective fading can be conveniently combated with OFDM by repeating a portion of (or appending a cyclic prefix to) each transformed symbol to form a corresponding OFDM symbol, which is then transmitted.

The length of the cyclic prefix (i.e., the amount to repeat) for each OFDM symbol is dependent on the delay spread of the wireless channel. In particular, to effectively combat ISI, the cyclic prefix should be longer than the maximum expected delay spread for the system.

In an embodiment, cyclic prefixes of different lengths may be used for the OFDM symbols, depending on the expected delay spread. For the MIMO WLAN system described above, a cyclic prefix of 400 nsec (8 samples) or 800 nsec (16 samples) may be selected for use for the OFDM symbols. A "short" OFDM symbol uses the 400 nsec cyclic prefix and has a duration of 3.6 μsec. A "long" OFDM symbol uses the 800 nsec cyclic prefix and has a duration of 4.0 μsec. Short OFDM symbols may be used if the maximum expected delay spread is 400 nsec or less, and long OFDM symbols may be used if the delay spread is greater than 400 nsec. Different cyclic prefixes may be selected for use for different transport channels, and the cyclic prefix may also be dynamically selectable, as described below. Higher system throughput may be achieved by using the shorter cyclic prefix when possible, since more OFDM symbols of shorter duration can be transmitted over a given fixed time interval.

Figure 2:
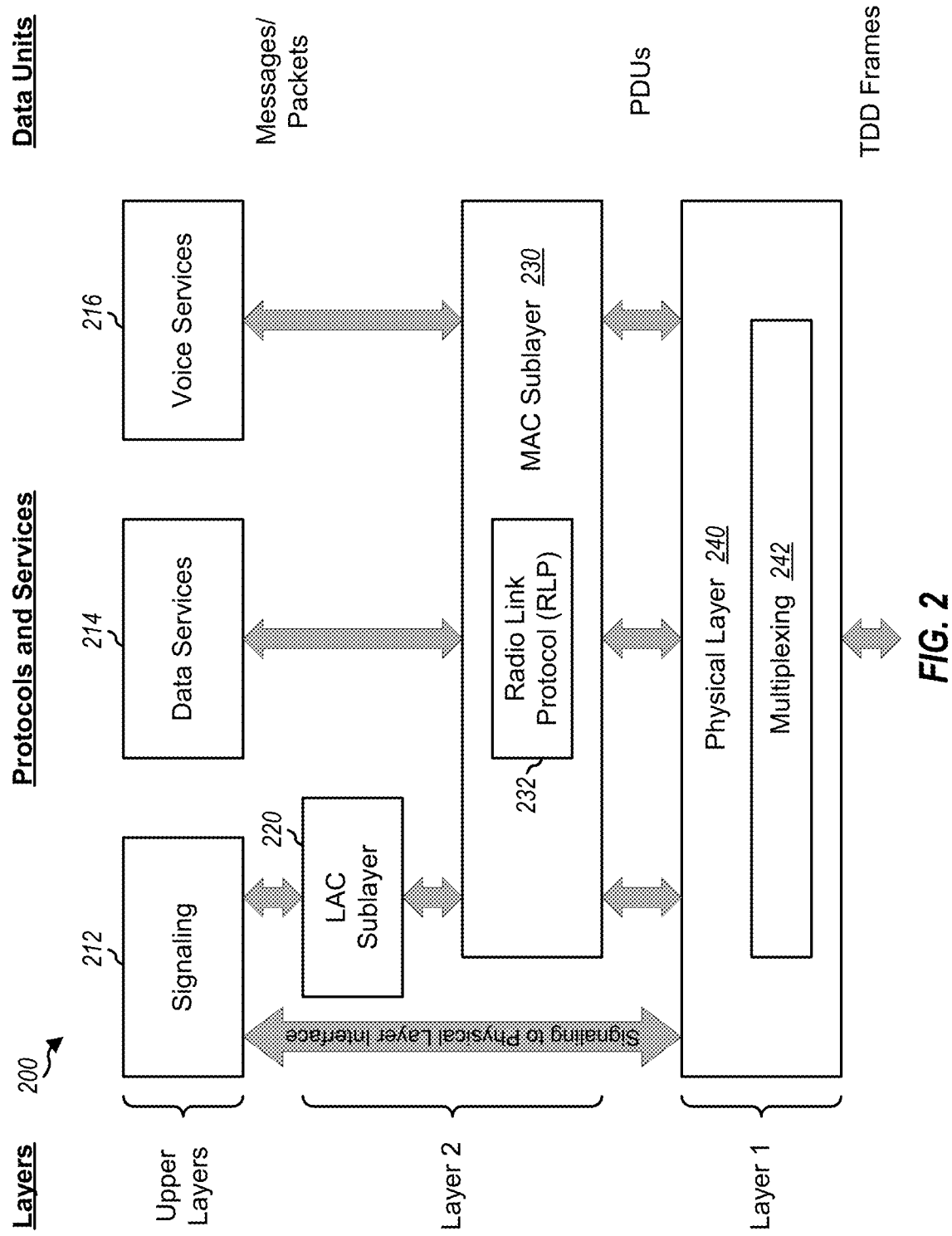
FIG. 2 shows a layer structure for the MIMO WLAN system.

FIG. 2 illustrates a layer structure 200 that may be used for the MIMO WLAN system. As shown in FIG. 2, in one embodiment, layer structure 200 includes (1) applications and upper layer protocols that approximately correspond to Layer 3 and higher of the ISO/OSI reference model (upper layers), (2) protocols and services that correspond to Layer 2 (the link layer), and (3) protocols and services that correspond to Layer 1 (the physical layer).

The upper layers includes various applications and protocols, such as signaling services 212, data services 214, voice services 216, circuit data applications, and so on. Signaling is typically provided as messages and data is typically provided as packets. The services and applications in the upper layers originate and terminate messages and packets according to the semantics and timing of the communication protocol between the access point and the user terminal. The upper layers utilize the services provided by Layer 2.

Layer 2 supports the delivery of messages and packets generated by the upper layers. In the embodiment shown in FIG. 2, Layer 2 includes a Link Access Control (LAC) sublayer 220 and a Medium Access Control (MAC) sublayer 230. The LAC sublayer implements a data link protocol that provides for the correct transport and delivery of messages generated by the upper layers. The LAC sublayer utilizes the services provided by the MAC sublayer and Layer 1. The MAC sublayer is responsible for transporting messages and packets using the services provided by Layer 1. The MAC sublayer controls the access to Layer 1 resources by the applications and services in the upper layers. The MAC sublayer may include a Radio Link Protocol (RLP) 232, which is a retransmission mechanism that may be used to provide higher reliability for packet data. Layer 2 provides protocol data units (PDUs) to Layer 1.

Layer 1 comprises physical layer 240 and supports the transmission and reception of radio signals between the access point and user terminal. The physical layer performs coding, interleaving, modulation, and spatial processing for various transport channels used to send messages and packets generated by the upper layers. In this embodiment, the physical layer includes a multiplexing sublayer 242 that multiplexes processed PDUs for various transport channels into the proper frame format. Layer 1 provides data in units of frames.

It should be understood by one skilled in the art that various other suitable layer structures may also be designed and used for the MIMO WLAN system.

Figure 3:
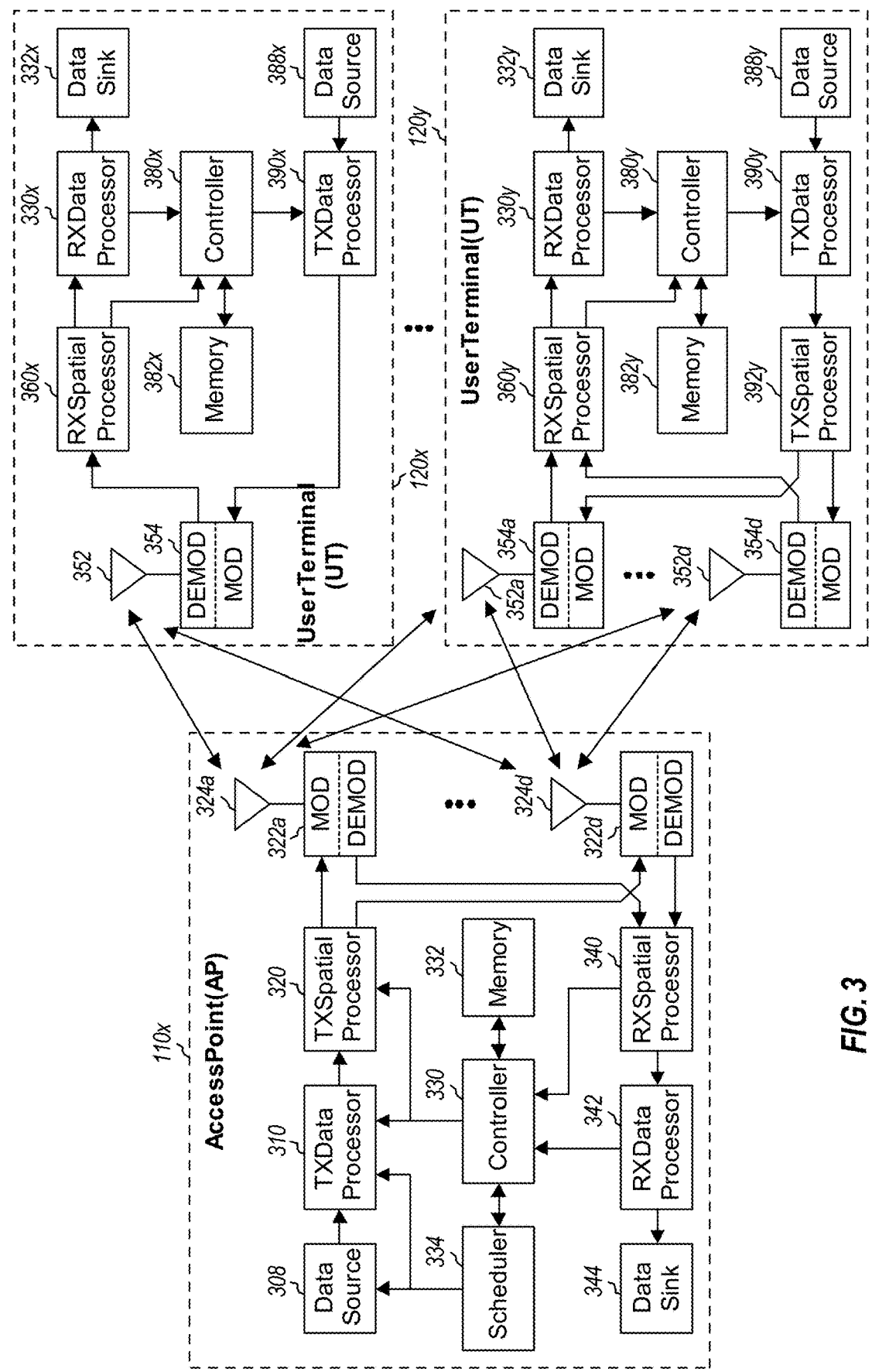
FIG. 3 is a block diagram illustrating various components of an access point and user terminals.

FIG. 3 shows a block diagram of one embodiment of an access point 110x and two user terminals 120x and 120y within the MIMO WLAN system.

On the downlink, at access point 110x, a transmit (TX) data processor 310 receives traffic data (e.g., information bits) from a data source 308 and signaling and other information from a controller 330 and possibly a scheduler 334. These various types of data may be sent on different transport channels that are described in more details below. TX data processor 310 "frames" the data (if necessary), scrambles the framed/unframed data, encodes the scrambled data, interleaves (i.e., reorders) the coded data, and maps the interleaved data into modulation symbols. For simplicity, a "data symbol" refers to a modulation symbol for traffic data, and a "pilot symbol" refers to a modulation symbol for pilot. The scrambling randomizes the data bits. The encoding increases the reliability of the data transmission. The interleaving provides time, frequency, and/or spatial diversity for the code bits. The scrambling, coding, and modulation may be performed based on control signals provided by controller 330. TX data processor 310 provides a stream of modulation symbols for each spatial channel used for data transmission.

A TX spatial processor 320 receives one or more modulation symbol streams from TX data processor 310 and performs spatial processing on the modulation symbols to provide four streams of transmit symbols, one stream for each transmit antenna.

Each modulator (MOD) 322 receives and processes a respective transmit symbol stream to provide a corresponding stream of OFDM symbols. Each OFDM symbol stream is further processed to provide a corresponding downlink modulated signal. The four downlink modulated signals from modulator 322a through 322d are then transmitted from four antennas 324a through 324d, respectively.

At each user terminal 120, one or multiple antennas 352 receive the transmitted downlink modulated signals, and each receive antenna provides a received signal to a respective demodulator (DEMOD) 354. Each demodulator 354 performs processing complementary to that performed at modulator 322 and provides received symbols. A receive (RX) spatial processor 360 then performs spatial processing on the received symbols from all demodulators 354 to provide recovered symbols, which are estimates of the modulation symbols sent by the access point.

An RX data processor 370 receives and demultiplexes the recovered symbols into their respective transport channels. The recovered symbols for each transport channel may be symbol demapped, deinterleaved, decoded, and descrambled to provide decoded data for that transport channel. The decoded data for each transport channel may include recovered packet data, messages, signaling, and so on, which are provided to a data sink 372 for storage and/or a controller 380 for further processing.

For the downlink, at each active user terminal 120, RX spatial processor 360 further estimates the downlink to obtain channel state information (CSI). The CSI may include channel response estimates, received SNRs, and so on. RX data processor 370 may also provide the status of each packet/frame received on the downlink. A controller 380 receives the channel state information and the packet/frame status and determines the feedback information to be sent back to the access point. The feedback information is processed by a TX data processor 390 and a TX spatial processor 392 (if present), conditioned by one or more modulators 354, and transmitted via one or more antennas 352 back to the access point.

At access point 110, the transmitted uplink signal(s) are received by antennas 324, demodulated by demodulators 322, and processed by an RX spatial processor 340 and an RX data processor 342 in a complementary manner to that performed at the user terminal. The recovered feedback information is then provided to controller 330 and a scheduler 334.

In one embodiment, scheduler 334 uses the feedback information to perform a number of functions such as (1) selecting a set of user terminals for data transmission on the downlink and uplink, (2) selecting the transmission rate(s) and the transmission mode for each selected user terminal, and (3) assigning the available FCH/RCH resources to the selected terminals. Scheduler 334 and/or controller 330 further uses information (e.g., steering vectors) obtained from the uplink transmission for the processing of the downlink transmission.

As mentioned above, a number of services and applications may be supported by the MIMO WLAN system and various transport channels may be defined for the MIMO WLAN system to carry various types of data. Table 3 lists an exemplary set of transport channels and also provides a brief description for each transport channel.

TABLE 3

| Transport channels | | Description |
|---|---|---|
| Broadcast channel | BCH | Used by the access point to transmit pilot and system parameters to the user terminals. |

TABLE 3-continued

| Transport channels | | Description |
|---|---|---|
| Forward control channel | FCCH | Used by the access point to allocate resources on the downlink and uplink. The resource allocation may be performed on a frame-by-frame basis. Also used to provide acknowledgment for messages received on the RACH. |
| Forward channel | FCH | Used by the access point to transmit user-specific data to the user terminals and possibly a reference (pilot) used by the user terminals for channel estimation. May also be used in a broadcast mode to send page and broadcast messages to multiple user terminals. |
| Random access channel | RACH | Used by the user terminals to gain access to the system and send short messages to the access point. |
| Reverse channel | RCH | Used by the user terminals to transmit data to the access point. May also carry a reference used by the access point for channel estimation. |

As shown in Table 3, the downlink transport channels used by the access point includes the BCH, FCCH, and FCH. The uplink transport channels used by the user terminals include the RACH and RCH. It should be recognized by one skilled in the art that the transport channels listed in Table 3 represent an exemplary embodiment of a channel structure that may be used for the MIMO WLAN system. Fewer, additional, and/or different transport channels may also be defined for use for the MIMO WLAN system. For example, certain functions may be supported by function-specific transport channels (e.g., pilot, paging, power control, and sync channel channels). Thus, other channel structures with different sets of transport channels may be defined and used for the MIMO WLAN system, within the scope of the invention.

A number of frame structures may be defined for the transport channels. The specific frame structure to use for the MIMO WLAN system is dependent on various factors such as, for example, (1) whether the same or different frequency bands are used for the downlink and uplink and (2) the multiplexing scheme used to multiplex the transport channels together.

If only one frequency band is available, then the downlink and uplink may be transmitted on different phases of a frame using time division duplexing (TDD). If two frequency bands are available, then the downlink and uplink may be transmitted on different frequency bands using frequency division duplexing (FDD).

For both TDD and FDD, the transport channels may be multiplexed together using time division multiplexing (TDM), code division multiplexing (CDM), frequency division multiplexing (FDM), and so on. For TDM, each transport channel is assigned to a different portion of a frame. For CDM, the transport channels are transmitted concurrently but each transport channel is channelized by a different channelization code, similar to that performed in a code division multiple access (CDMA) system. For FDM, each transport channel is assigned a different portion of the frequency band for the link.

Table 4 lists the various frame structures that may be used to carry the transport channels. Each of these frame structures is described in further detail below.

TABLE 4

| | Shared frequency band for downlink and uplink | Separate frequency bands for downlink and uplink |
|---|---|---|
| Time division | TDD-TDM frame structure | FDD-TDM frame structure |
| Code division | TDD-CDM frame structure | FDD-CDM frame structure |

Figure 4A:
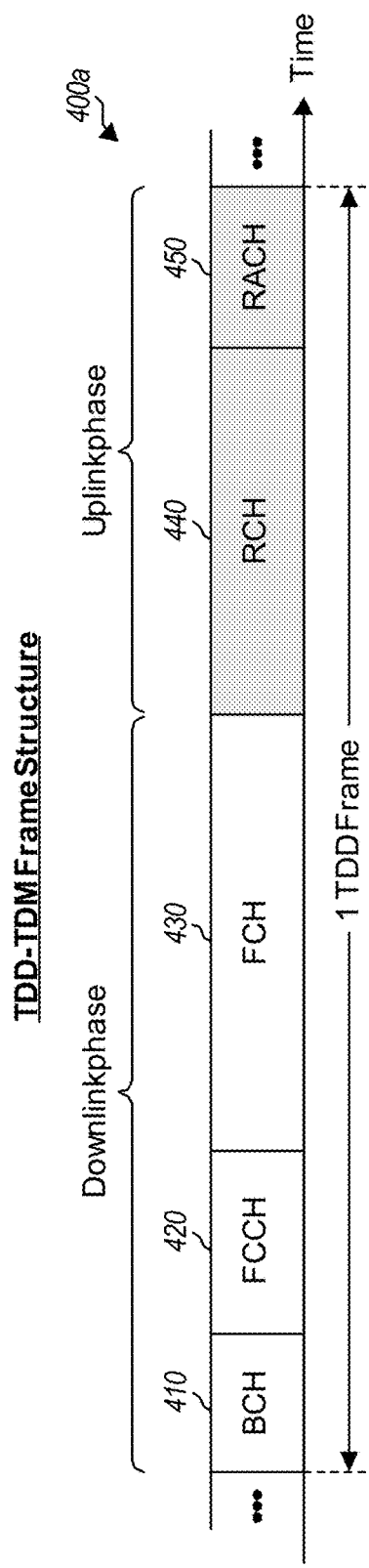
FIGS. 4A, 4B and 4C show a TDD-TDM frame structure, an FDD-TDM frame structure, and an FDD-CDM frame structure, respectively.

FIG. 4A illustrates an embodiment of a TDD-TDM frame structure 400a that may be used if a single frequency band is used for both the downlink and uplink. Data transmission occurs in units of TDD frames. Each TDD frame may be defined to span a particular time duration. The frame duration may be selected based on various factors such as, for example, (1) the bandwidth of the operating band, (2) the expected sizes of the PDUs for the transport channels, and so on. In general, a shorter frame duration may provide reduced delays. However, a longer frame duration may be more efficient since header and overhead may represent a smaller fraction of the frame. In one embodiment, each TDD frame has a duration of 2 msec.

As shown in FIG. 4A, each TDD frame can be partitioned into a downlink phase and an uplink phase. The downlink phase is further partitioned into three segments for the three downlink transport channels—the BCH, FCCH, and FCH. The uplink phase is further partitioned into two segments for the two uplink transport channels—the RCH and RACH.

The segment for each transport channel may be defined to have either a fixed duration or a variable duration that can change from frame to frame. In one embodiment, the BCH segment is defined to have a fixed duration, and the FCCH, FCH, RCH, and RACH segments are defined to have variable durations.

The segment for each transport channel may be used to carry one or more protocol data units (PDUs) for that transport channel. In the embodiment shown in FIG. 4A, a BCH PDU is transmitted in a first segment 410, an FCCH PDU is transmitted in a second segment 420, and one or more FCH PDUs are transmitted in a third segment 430 of the downlink phase. On the uplink phase, one or more RCH PDUs are transmitted in a fourth segment 440 and one or more RACH PDUs are transmitted in a fifth segment 450 of the TDD frame.

Frame structure 400a represents one arrangement of the various transport channels within a TDD frame. This arrangement can provide certain benefits such as reduced delays for data transmission on the downlink and uplink. The BCH is transmitted first in the TDD frame since it carries system parameters that may be used for the PDUs of the other transport channels within the same TDD frame. The FCCH is transmitted next since it carries resource allocation (e.g., channel assignment) information indicative of which user terminal(s) are designated to receive downlink data on the FCH and which user terminal(s) are designated to transmit uplink data on the RCH within the current TDD frame. Other TDD-TDM frame structures may also be defined and used for the MIMO WLAN system.

Figure 4B:
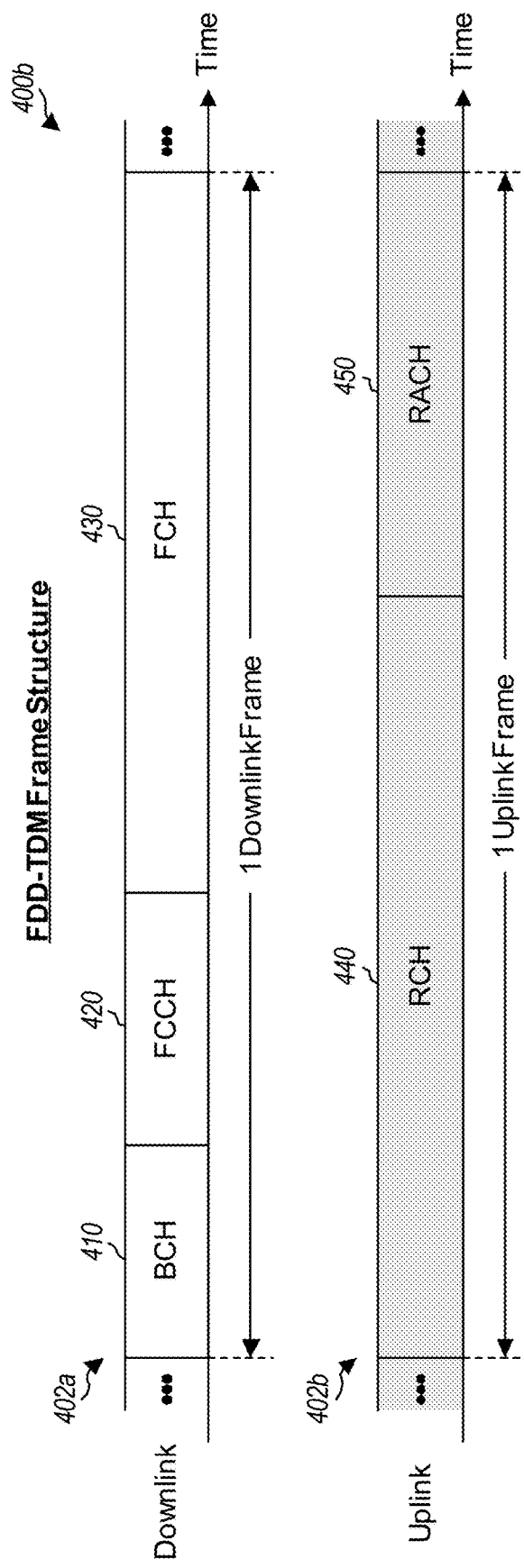

FIG. 4B illustrates an embodiment of an FDD-TDM frame structure 400b that may be used if the downlink and uplink are transmitted using two separate frequency bands. Downlink data is transmitted in a downlink frame 402a, and uplink data is transmitted in an uplink frame 402b. Each downlink and uplink frame may be defined to span a particular time duration (e.g., 2 msec). For simplicity, the downlink and uplink frames may be defined to have the same duration and may further be defined to be aligned at the frame boundaries. However, different frame durations and/or non-aligned (i.e., offset) frame boundaries may also be used for the downlink and uplink.

As shown in FIG. 4B, the downlink frame is partitioned into three segments for the three downlink transport channels. The uplink frame is partitioned into two segments for the two uplink transport channels. The segment for each transport channel may be defined to have a fixed or variable duration, and may be used to carry one or more PDUs for that transport channel.

In the embodiment shown in FIG. 4B, the downlink frame carries a BCH PDU, an FCCH PDU, and one or more FCH PDUs in segments 410, 420, and 430, respectively. The uplink frame carries one or more RCH PDUs and one or more RACH PDUs in segments 440 and 450, respectively. This arrangement may provide the benefits described above (e.g., reduced delays for data transmission). Other FDD-TDM frame structures may also be defined and used for the MIMO WLAN system, and this is within the scope of the invention.

Figure 4C:
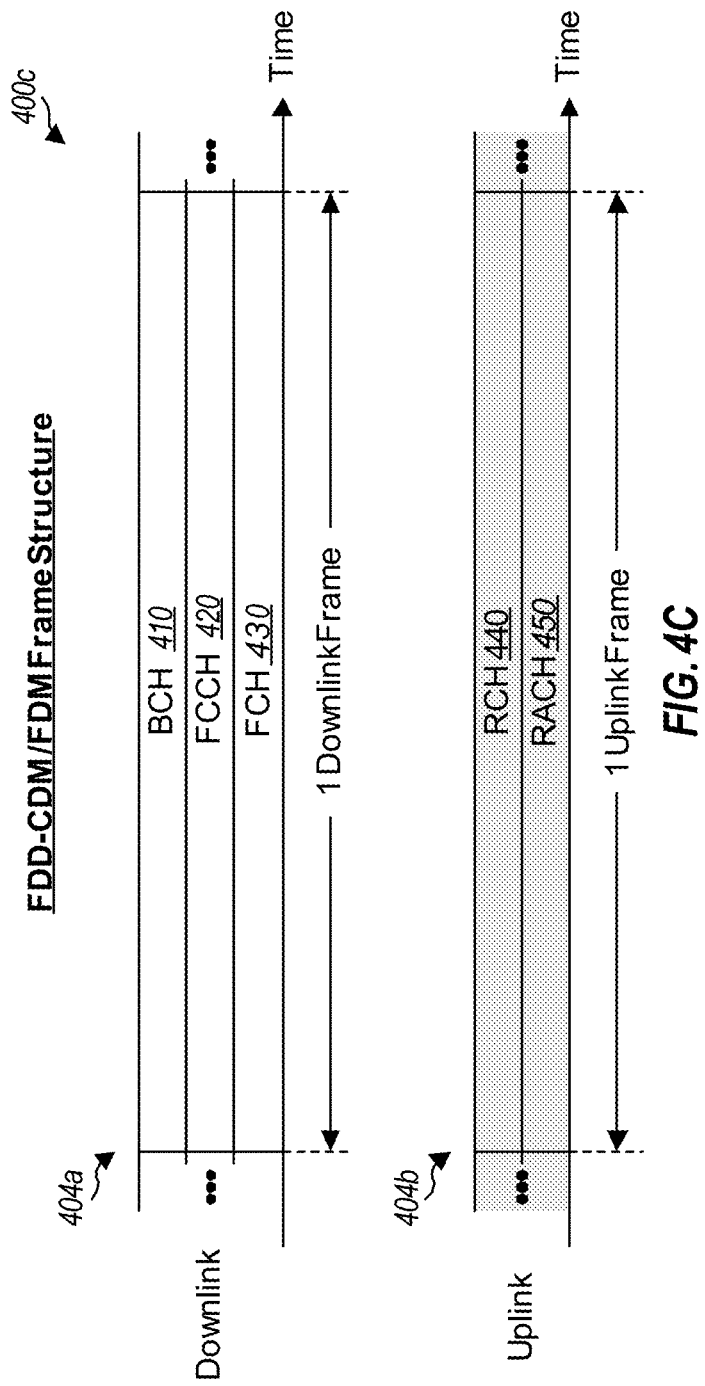

FIG. 4C illustrates an embodiment of an FDD-CDM/FDM frame structure 400c that may also be used if the downlink and uplink are transmitted using separate frequency bands. Downlink data may be transmitted in a downlink frame 404a, and uplink data may be transmitted in an uplink frame 404b. The downlink and uplink frames may be defined to have the same duration (e.g., 2 msec) and aligned at the frame boundaries.

As shown in FIG. 4C, the three downlink transport channels are transmitted concurrently in the downlink frame, and the two uplink transport channels are transmitted concurrently in the uplink frame. For CDM, the transport channels for each link are "channelized" with different channelization codes, which may be Walsh codes, orthogonal variable spreading factor (OVSF) codes, quasi-orthogonal functions (QOF), and so on. For FDM, the transport channels for each link are assigned different portions of the frequency band for the link. Different amounts of transmit power may also be used for different transport channels in each link.

Other frame structures may also be defined for the downlink and uplink transport channels, and this is within the scope of the invention. Moreover, it is possible to use different types of frame structure for the downlink and uplink. For example, a TDM-based frame structure may be used for the downlink and a CDM-based frame structure may be used for the uplink.

In one embodiment, the transport channels as described above are used to send various types of data and may be categorized into two groups: common transport channels and dedicated transport channels.

The common transport channels, in one embodiment, may include the BCH, FCCH, and RACH. These transport channels are used to send data to or receive data from multiple user terminals. The BCH and FCCH can be transmitted by the access point using the diversity mode. On the uplink, the RACH can be transmitted by the user terminals using the beam-steering mode (if supported by the user terminal). The BCH can be operated at a known fixed rate so that the user terminals can receive and process the BCH without any additional information. As described in more details below, the FCCH support multiple rates to allow for greater efficiency. Each "rate" or "rate set" may be associated with a particular code rate (or coding scheme) and a particular modulation scheme.

The dedicated transport channels, in one embodiment, include the FCH and RCH. These transport channels are normally used to send user-specific data to or by specific user terminals. The FCH and RCH may be dynamically allocated to the user terminals as necessary and as available. The FCH may also be used in a broadcast mode to send overhead, page, and broadcast messages to the user terminals. In general, the overhead, page, and broadcast messages are transmitted prior to any user-specific data on the FCH.

Figure 5:
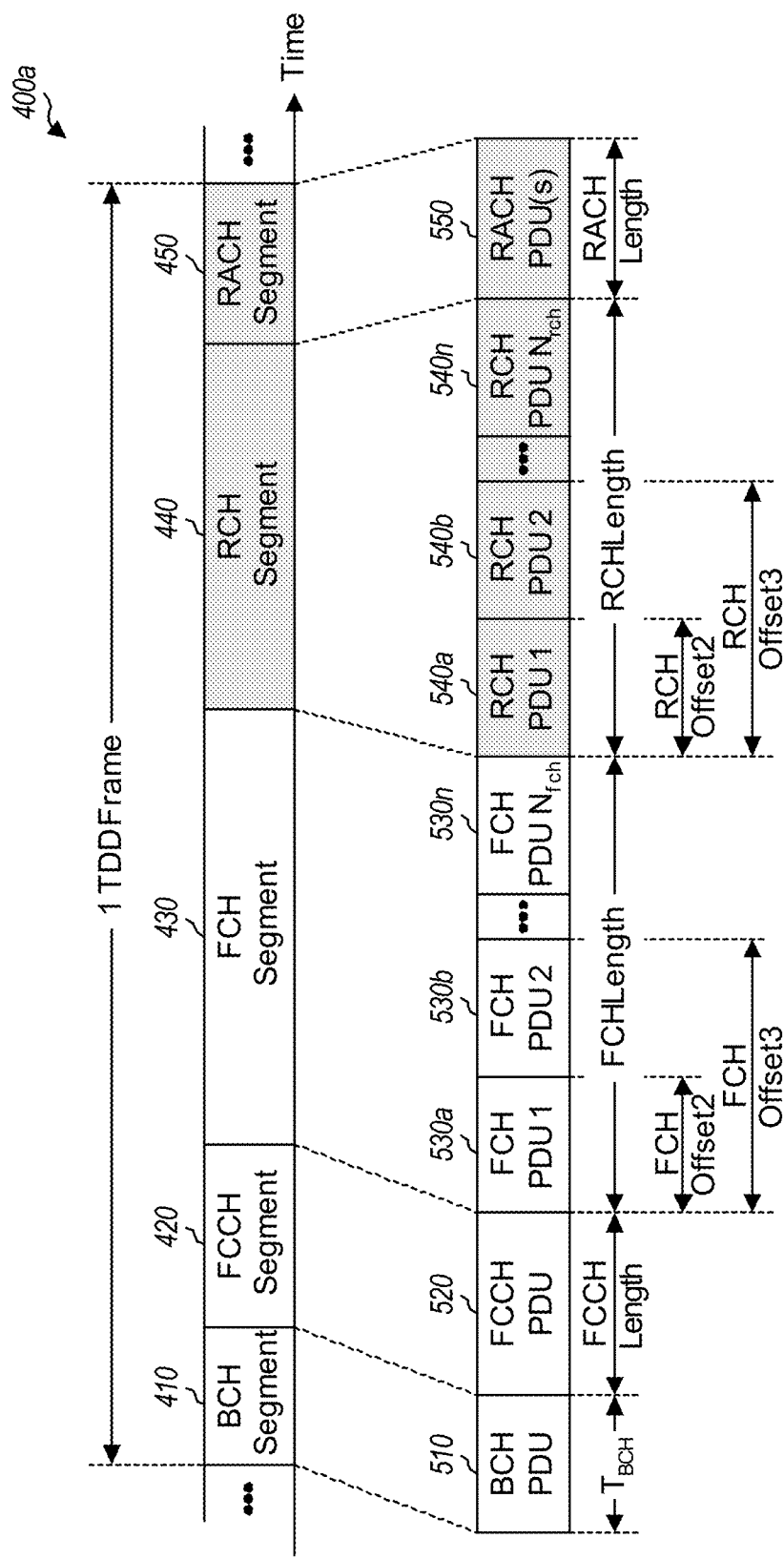
FIG. 5 shows the TDD-TDM frame structure with five transport channels—BCH, FCCH, FCH, RCH, and RACH.

FIG. 5 illustrates an exemplary transmission on the BCH, FCCH, FCH, RCH, and RACH based on TDD-TDM frame structure 400a. In this embodiment, one BCH PDU 510 and one FCCH PDU 520 are transmitted in BCH segment 410 and FCCH segment 420, respectively. FCH segment 430 may be used to send one or more FCH PDUs 530, each of which may be intended for a specific user terminal or multiple user terminals. Similarly, one or more RCH PDUs 540 may be sent by one or more user terminals in RCH segment 440. The start of each FCH/RCH PDU is indicated by an FCH/RCH offset from the end of the preceding segment. A number of RACH PDUs 550 may be sent in RACH segment 450 by a number of user terminals to access the system and/or to send short messages.

In one embodiment, the BCH is used by the access point to transmit a beacon pilot, a MIMO pilot, and system parameters to the user terminals. The beacon pilot is used by the user terminals to acquire system timing and frequency. The MIMO pilot is used by the user terminals to estimate the MIMO channel formed by the access point antennas and their own antennas. The system parameters specify various attributes of the downlink and uplink transmissions. For example, since the durations of the FCCH, FCH, RACH, and RCH segments are variable, the system parameters that specify the length of each of these segments for the current TDD frame are sent in the BCH.

Figure 6:
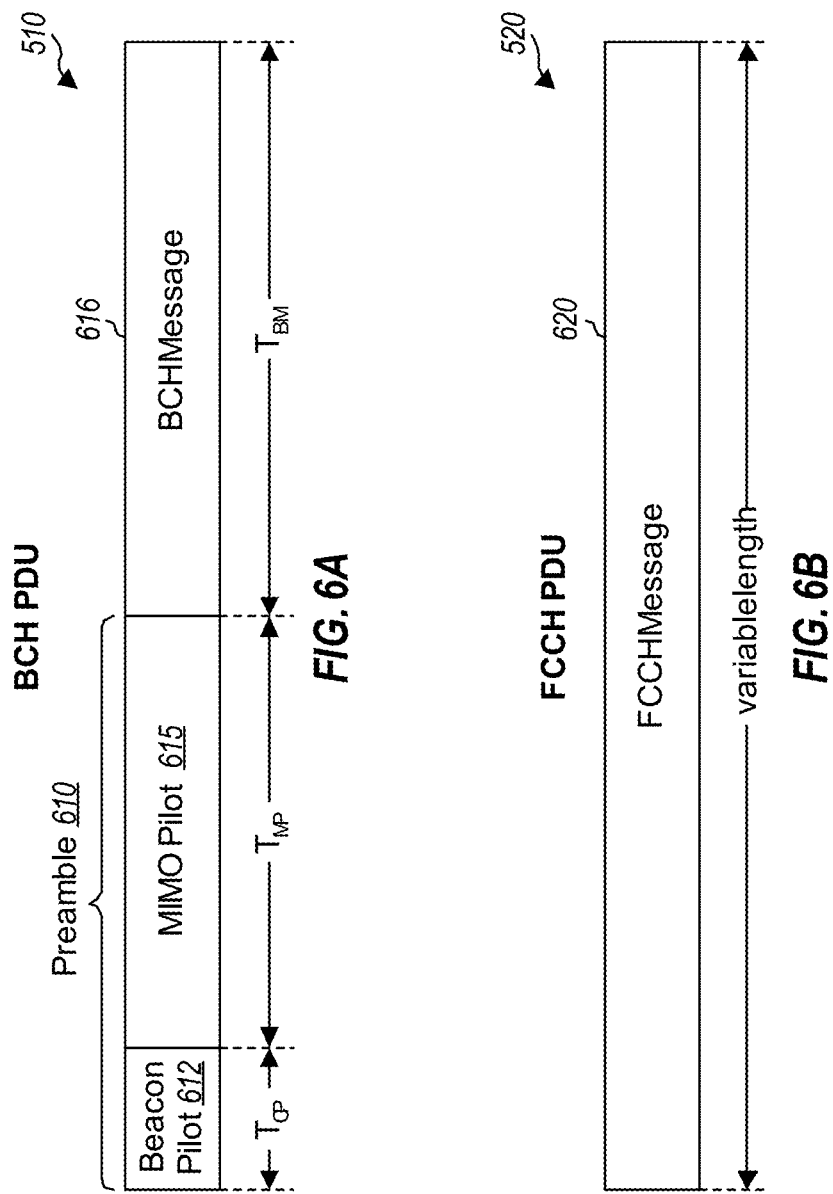
FIGS. 6A and 6B illustrate various PDU formats for the various transport channels.

FIG. 6A illustrates an embodiment of BCH PDU 410. In this embodiment, BCH PDU 410 includes a preamble portion 510 and a message portion 516. Preamble portion 510 further includes a beacon pilot portion 512 and a MIMO pilot portion 514. Portion 512 carries a beacon pilot and has a fixed duration of $T_{CP}=8$ μsec. Portion 514 carries a MIMO pilot and has a fixed duration of $T_{MP}=32$ μsec. Portion 516 carries a BCH message and has a fixed duration of $T_{BM}=40$ μsec. A preamble may be used to send one or more types of pilot and/or other information. A beacon pilot comprises a specific set of modulation symbols that is transmitted from all transmit antennas. A MIMO pilot comprises a specific set of modulation symbols that is transmitted from all transmit antennas with different orthogonal codes, which then allows the receivers to recover the pilot transmitted from each antenna. Different sets of modulation symbols may be used for the beacon and MIMO pilots.

In one embodiment, the BCH message carries system configuration information. Table 5 lists the various fields for an exemplary BCH message format.

TABLE 5

BCH Message

| Fields/Parameter Names | Length (bits) | Description |
|---|---|---|
| Frame Counter | 4 | TDD frame counter |
| Net ID | 10 | Network identifier (ID) |
| AP ID | 6 | Access point ID |
| AP Tx Lvl | 4 | Access point transmit level |
| AP Rx Lvl | 3 | Access point receive level |
| FCCH Length | 6 | Duration of FCCH (in units of OFDM symbols) |
| FCCH Rate | 2 | Physical layer rate of FCCH |
| FCH Length | 9 | Duration of FCH (in units of OFDM symbols) |
| RCH Length | 9 | Duration of RCH (in units of OFDM symbols) |
| RACH Length | 5 | Duration of RACH (in units of RACH slots) |
| RACH Slot Size | 2 | Duration of each RACH slot (in units of OFDM symbols) |
| RACH Guard Interval | 2 | Guard interval at the end of RACH |
| Cyclic Prefix Duration | 1 | Cyclic prefix duration |
| Page Bit | 1 | "0" = page message sent on FCH "1" = no page message sent |
| Broadcast Bit | 1 | "0" = broadcast message sent on FCH "1" = no broadcast message sent |
| RACH Acknowledgment Bit | 1 | "0" = RACH acknowledgment sent on FCH "1" = no RACH acknowledgment sent |
| CRC | 16 | CRC value for the BCH message |
| Tail Bits | 6 | Tail bits for convolutional encoder |
| Reserved | 32 | Reserved for future use |

The Frame Counter value may be used to synchronize various processes at the access point and user terminals (e.g., the pilot, scrambling codes, cover code, and so on). A frame counter may be implemented with a 4-bit counter that wraps around. This counter is incremented at the start of each TDD frame, and the counter value is included in the Frame Counter field. The Net ID field indicates the identifier (ID) of the network to which the access point belongs. The AP ID field indicates the ID of the access point within the network ID. The AP Tx Lvl and AP Rx Lvl fields indicate the maximum transmit power level and the desired receive power level at the access point, respectively. The desired receive power level may be used by the user terminal to determine the initial uplink transmit power.

The FCCH Length, FCH Length, and RCH Length fields indicate the lengths of the FCCH, FCH, and RCH segments, respectively, for the current TDD frame. In one embodiment, the lengths of these segments are given in units of OFDM symbols. The OFDM symbol duration for the BCH can be fixed at 4.0 μsec. The OFDM symbol duration for all other transport channels (e.g., the FCCH, FCH, RACH, and RCH) is variable and depends on the selected cyclic prefix, which is specified by the Cyclic Prefix Duration field. The FCCH Rate field indicates the rate used for the FCCH for the current TDD frame.

The RACH Length field indicates the length of the RACH segment, which is given in units of RACH slots. The duration of each RACH slot is given by the RACH Slot Size field, in units of OFDM symbols. The RACH Guard Interval field indicates the amount of time between the last RACH slot and the start of the BCH segment for the next TDD frame.

The Page Bit and Broadcast Bit indicate whether or not page messages and broadcast messages, respectively, are being sent on the FCH in the current TDD frame. These two bits may be set independently for each TDD frame. The RACH Acknowledgment Bit indicates whether or not acknowledgments for PDUs sent on the RACH in prior TDD frames are being sent on the FCCH in the current TDD frame.

The CRC field includes a CRC value for the entire BCH message. This CRC value may be used by the user terminals to determine whether the received BCH message is decoded correctly or in error. The Tail Bits field includes a group of zeros used to reset the convolutional encoder to a known state at the end of the BCH message.

As shown in Table 5, the BCH message includes a total of 120 bits. These 120 bits may be transmitted with 10 OFDM symbols. Table 5 shows one embodiment of the format for the BCH message. Other BCH message formats with fewer, additional, and/or different fields may also be defined and used, and this is within the scope of the invention.

In one embodiment, the access point may allocate resources for the FCH and RCH on a per frame basis. The FCCH is used by the access point to convey the resource allocation information for the FCH and RCH (e.g., the channel assignments).

FIG. 6B illustrates an embodiment of FCCH PDU 420. In this embodiment, the FCCH PDU includes only a portion 520 for an FCCH message. The FCCH message has a variable duration that can change from frame to frame, depending on the amount of scheduling information being carried on the FCCH for that frame. The FCCH duration is in even number of OFDM symbols and given by the FCCH Length field on the BCH message. The duration of messages sent using the diversity mode (e.g., BCH and FCCH messages) is given in even number of OFDM symbols because the diversity mode transmits OFDM symbols in pairs.

In an embodiment, the FCCH can be transmitted using four possible rates. The specific rate used for the FCCH PDU in each TDD frame is indicated by the FCCH Phy Mode field in the BCH message. Each FCCH rate corresponds to a particular code rate and a particular modulation scheme and is further associated with a particular transmission mode.

An FCCH message may include zero, one, or multiple information elements (IEs). Each information element may be associated with a specific user terminal and may be used to provide information indicative of the assignment of FCH/RCH resources for that user terminal. Table 6 lists the various fields for an exemplary FCCH message format.

TABLE 6

FCCH Message

| Fields/Parameter Names | Length (bits) | Description |
|---|---|---|
| N_IE | 6 | Number of IEs included in the FCCH message |
| N_IE information elements, each including: | | |
| IE Type | 4 | IE type |
| MAC ID | 10 | ID assigned to the user terminal |
| Control Fields | 48 or 72 | Control fields for channel assignment |
| Padding Bits | Variable | Pad bits to achieve even number of OFDM symbols in the FCCH message |
| CRC | 16 | CRC value for the FCCH message |
| Tail Bits | 6 | Tail bits for convolutional encoder |

The N_IE field indicates the number of information elements included in the FCCH message sent in the current TDD frame. For each information element (IE) included in the FCCH message, the IE Type field indicates the particular type of this IE. Various IE types are defined for use to allocate resources for different types of transmissions, as described below.

The MAC ID field identifies the specific user terminal for which the information element is intended. Each user terminal registers with the access point at the start of a communication session and is assigned a unique MAC ID by the access point. This MAC ID is used to identify the user terminal during the session.

The Control Fields are used to convey channel assignment information for the user terminal and are described in detail below. The Padding Bits field includes a sufficient number of padding bits so that the overall length of the FCCH message is an even number of OFDM symbols. The FCCH CRC field includes a CRC value that may be used by the user terminals to determine whether the received FCCH message is decoded correctly or in error. The Tail Bits field includes zeros used to reset the convolutional encoder to a known state at the end of the FCCH message. Some of these fields are described in further detail below.

A number of transmission modes are supported by the MIMO WLAN system for the FCH and RCH, as indicated in Table 1. Moreover, a user terminal may be active or idle during a connection. Thus, a number of types of IE are defined for use to allocate FCH/RCH resources for different types of transmissions. Table 7 lists an exemplary set of IE types.

TABLE 7

FCCH IE Types

| IE Type | IE Size (bits) | IE Type | Description |
|---|---|---|---|
| 0 | 48 | Diversity Mode | Diversity mode only |
| 1 | 72 | Spatial Multiplexing Mode | Spatial multiplexing mode-variable rate services |
| 2 | 48 | Idle Mode | Idle state-variable rate services |
| 3 | 48 | RACH Acknowledgment | RACH acknowledgment-diversity mode |
| 4 | | Beam Steering Mode | Beam steering mode |
| 5-15 | — | Reserved | Reserved for future use |

For IE types 0, 1 and 4, resources are allocated to a specific user terminal for both the FCH and RCH (i.e., in channel pairs). For IE type 2, minimal resources are allocated to the user terminal on the FCH and RCH to maintain up-to-date estimate of the link. An exemplary format for each IE type is described below. In general, the rates and durations for the FCH and RCH can be independently assigned to the user terminals.

IE type 0 and 4 are used to allocate FCH/RCH resources for the diversity and beam-steering modes, respectively. For fixed low-rate services (e.g., voice), the rate remains fixed for the duration of the call. For variable rate services, the rate may be selected independently for the FCH and RCH. The FCCH IE indicates the location of the FCH and RCH PDUs assigned to the user terminal. Table 8 lists the various fields of an exemplary IE Type 0 and 4 information element.

TABLE 8

FCCH IE Type 0 and 4

| Fields/Parameter Names | Length (bits) | Description |
|---|---|---|
| IE Type | 4 | IE type |
| MAC ID | 10 | Temporary ID assigned to the user terminal |
| FCH Offset | 9 | FCH offset from start of the TDD frame (in OFDM symbols) |
| FCH Preamble Type | 2 | FCH preamble size (in OFDM symbols) |
| FCH Rate | 4 | Rate for the FCH |
| RCH Offset | 9 | RCH offset from start of the TDD frame (in OFDM symbols) |
| RCH Preamble Type | 2 | RCH preamble size (in OFDM symbols) |
| RCH Rate | 4 | Rate for the RCH |
| RCH Timing Adjustment | 2 | Timing adjustment parameter for RCH |
| RCH Power Control | 2 | Power control bits for RCH |

The FCH and RCH Offset fields indicate the time offset from the beginning of the current TDD frame to the start of the FCH and RCH PDUs, respectively, assigned by the information element. The FCH and RCH Rate fields indicate the rates for the FCH and RCH, respectively.

The FCH and RCH Preamble Type fields indicate the size of the preamble in the FCH and RCH PDUs, respectively. Table 9 lists the values for the FCH and RCH Preamble Type fields and the associated preamble sizes.

TABLE 9

Preamble Type

| Type | Bits | Preamble Size |
|---|---|---|
| 0 | 00 | 0 OFDM symbol |
| 1 | 01 | 1 OFDM symbol |
| 2 | 10 | 4 OFDM symbols |
| 3 | 11 | 8 OFDM symbols |

The RCH Timing Adjustment field includes two bits used to adjust the timing of the uplink transmission from the user terminal identified by the MAC ID field. This timing adjustment is used to reduce interference in a TDD-based frame structure where the downlink and uplink transmissions are time division duplexed. Table 10 lists the values for the RCH Timing Adjustment field and the associated actions.

TABLE 10

RCH Timing Adjustment

| Bits | Description |
|---|---|
| 00 | Maintain current timing |
| 01 | Advance uplink transmit timing by 1 sample |
| 10 | Delay uplink transmit timing by 1 sample |
| 11 | Not used |

The RCH Power Control field includes two bits used to adjust the transmit power of the uplink transmission from the identified user terminal. This power control is used to reduce interference on the uplink. Table 11 lists the values for the RCH Power Control field and the associated actions.

TABLE 11

RCH Power Control

| Bits | Description |
|---|---|
| 00 | Maintain current transmit power |
| 01 | Increase uplink transmit power by δ dB, where δ is a system parameter. |
| 10 | Decrease uplink transmit power by δ dB, where δ is a system parameter. |
| 11 | Not used |

The channel assignment for the identified user terminal may be provided in various manners. In an embodiment, the user terminal is assigned FCH/RCH resources for only the current TDD frame. In another embodiment, the FCH/RCH resources are assigned to the terminal for each TDD frame until canceled. In yet another embodiment, the FCH/RCH resources are assigned to the user terminal for every n-th TDD frame, which is referred to as "decimated" scheduling of TDD frames. The different types of assignment may be indicated by an Assignment Type field in the FCCH information element.

IE type 1 is used to allocate FCH/RCH resources to user terminals using the spatial multiplexing mode. The rate for these user terminals is variable, and may be selected independently for the FCH and RCH. Table 12 lists the various fields of an exemplary IE type 1 information element.

TABLE 12

FCCH IE Type 1

| Fields/Parameter Names | Length (bits) | Description |
|---|---|---|
| IE Type | 4 | IE type |
| MAC ID | 10 | Temporary ID assigned to the user terminal |
| FCH Offset | 9 | FCH offset from end of FCCH (in OFDM symbols) |
| FCH Preamble Type | 2 | FCH preamble size (in OFDM symbols) |
| FCH Spatial Channel 1 Rate | 4 | Rate for the FCH for spatial channel 1 |
| FCH Spatial Channel 2 Rate | 4 | Rate for the FCH for spatial channel 2 |
| FCH Spatial Channel 3 Rate | 4 | Rate for the FCH for spatial channel 3 |
| FCH Spatial Channel 4 Rate | 4 | Rate for the FCH for spatial channel 4 |
| RCH Offset | 9 | RCH offset from end of FCH (in OFDM symbols) |
| RCH Preamble Type | 2 | RCH preamble size (in OFDM symbols) |
| RCH Spatial Channel 1 Rate | 4 | Rate for the RCH for spatial channel 1 |
| RCH Spatial Channel 2 Rate | 4 | Rate for the RCH for spatial channel 2 |
| RCH Spatial Channel 3 Tate | 4 | Rate for the RCH for spatial channel 3 |
| RCH Spatial Channel 4 Rate | 4 | Rate for the RCH for spatial channel 4 |
| RCH Timing Adjustment | 2 | Timing adjustment parameter for RCH |
| Reserved | 2 | Reserved for future use |

For IE type 1, the rate for each spatial channel may be selected independently on the FCH and RCH. The interpretation of the rates for the spatial multiplexing mode is general in that it can specify the rate per spatial channel (e.g., for up to four spatial channels for the embodiment shown in Table 12). The rate is given per eigenmode if the transmitter performs spatial processing to transmit data on the eigenmodes. The rate is given per antenna if the transmitter simply transmits data from the transmit antennas and the receiver performs the spatial processing to isolate and recover the data (for the non-steered spatial multiplexing mode).

The information element includes the rates for all enabled spatial channels and zeros for the ones not enabled. User terminals with less than four transmit antennas set the unused FCH/RCH Spatial Channel Rate fields to zero. Since the access point is equipped with four transmit/receive antennas, user terminals with more than four transmit antennas may use them to transmit up to four independent data streams.

IE type 2 is used to provide control information for user terminals operating in an Idle state. In an embodiment, when a user terminal is in the Idle state, steering vectors used by the access point and user terminal for spatial processing are continually updated so that data transmission can start quickly if and when resumed. Table 13 lists the various fields of an exemplary IE type 2 information element.

TABLE 13

FCCH IE Type 2

| Fields/Parameter Names | Length (bits) | Description |
|---|---|---|
| IE Type | 4 | IE type |
| MAC ID | 10 | Temporary ID assigned to the user terminal |
| FCH Offset | 9 | FCH offset from end of FCCH (in OFDM symbols) |
| FCH Preamble Type | 2 | FCH preamble size (in OFDM symbols) |
| RCH Offset | 9 | RCH offset from end of FCH (in OFDM symbols) |
| RCH Preamble Type | 2 | RCH preamble size (in OFDM symbols) |
| Reserved | 12 | Reserved for future use |

IE type 3 is used to provide quick acknowledgment for user terminals attempting to access the system via the RACH. To gain access to the system or to send a short message to the access point, a user terminal may transmit an RACH PDU on the uplink. After the user terminal sends the RACH PDU, it monitors the BCH to determine if the RACH Acknowledgement Bit is set. This bit is set by the access point if any user terminal was successful in accessing the system and an acknowledgment is being sent for at least one user terminal on the FCCH. If this bit is set, then the user terminal processes the FCCH for acknowledgment sent on the FCCH. IE Type 3 information elements are sent if the access point desires to acknowledge that it correctly decoded the RACH PDUs from the user terminals without assigning resources. Table 14 lists the various fields of an exemplary IE Type 3 information element.

TABLE 14

FCCH IE Type 3

| Fields/Parameter Names | Length (bits) | Description |
|---|---|---|
| IE Type | 4 | IE type |
| MAC ID | 10 | Temporary ID assigned to user terminal |
| Reserved | 34 | Reserved for future use |

A single or multiple types of acknowledgment may be defined and sent on the FCCH. For example, a quick acknowledgment and an assignment-based acknowledgment may be defined. A quick acknowledgment may be used to simply acknowledge that the RACH PDU has been received by the access point but that no FCH/RCH resources have been assigned to the user terminal. An assignment-based acknowledgment includes assignments for the FCH and/or RCH for the current TDD frame.

A number of different rates are supported for the transport channels. Each rate is associated with a particular code rate and a particular modulation scheme, which collectively results in a particular spectral efficiency (or data rate). Table 15 lists the various rates supported by the system.

TABLE 15

| Rate Word | Spectral Efficiency (bps/Hz) | Code Rate | Modulation Scheme | Info bits/ OFDM symbol | Code bits/ OFDM symbol |
|---|---|---|---|---|---|
| 0000 | 0.0 | — | off | — | — |
| 0001 | 0.25 | 1/4 | BPSK | 12 | 48 |
| 0010 | 0.5 | 1/2 | BPSK | 24 | 48 |
| 0011 | 1.0 | 1/2 | QPSK | 48 | 96 |
| 0100 | 1.5 | 3/4 | QPSK | 72 | 96 |
| 0101 | 2.0 | 1/2 | 16 QAM | 96 | 192 |
| 0110 | 2.5 | 5/8 | 16 QAM | 120 | 192 |
| 0111 | 3.0 | 3/4 | 16 QAM | 144 | 192 |
| 1000 | 3.5 | 7/12 | 64 QAM | 168 | 288 |
| 1001 | 4.0 | 2/3 | 64 QAM | 192 | 288 |
| 1010 | 4.5 | 3/4 | 64 QAM | 216 | 288 |
| 1011 | 5.0 | 5/6 | 64 QAM | 240 | 288 |
| 1100 | 5.5 | 11/16 | 256 QAM | 264 | 384 |
| 1101 | 6.0 | 3/4 | 256 QAM | 288 | 384 |
| 1110 | 6.5 | 13/16 | 256 QAM | 312 | 384 |
| 1111 | 7.0 | 7/8 | 256 QAM | 336 | 384 |

While the FCCH channel structure as described above can be operable at different data rates, this structure may not be efficient because the rate employed on the FCCH is dictated or limited by the worst-case user in the system (e.g., the user that operates at the lowest data rate). For example, if one of the users can only receive and decode information on the FCCH at a low data rate of 0.25 bps/Hz, other users in the system will be adversely affected even though they are capable of operating at higher data rates. This is because the rate employed on the FCCH structure will be limited to that of the worst-case user, which is 0.25 bps/Hz. Thus, the FCCH performance and efficiency may be reduced by a single user. As described in more details below, the present invention provides a novel and more efficient FCCH channel structure that can be used to accommodate different users operable at different data rates.

In one embodiment, the new FCCH structure, also referred to as a tiered control channel structure or segregated control channel structure herein), comprises multiple control channels (e.g., 4 distinct control channels). Each of these distinct control channels, also called control subchannel or FCCH subchannel herein, can operate at one of the multiple overhead data rates (e.g., one or four different data rates as mentioned above).

Figure 7:
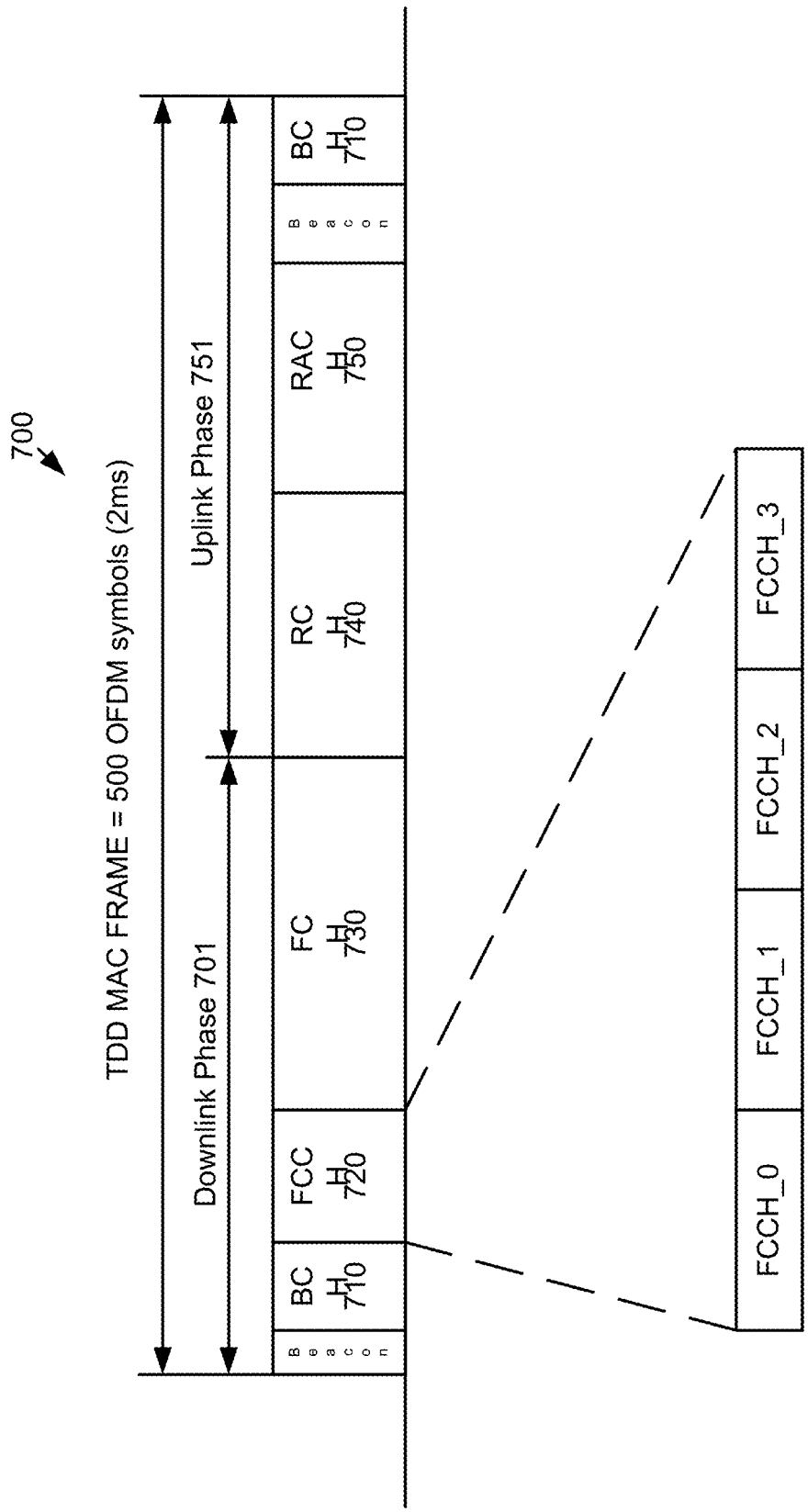
FIG. 7 shows a new FCCH structure, in accordance with one embodiment of the invention.

FIG. 7 illustrates a diagram of a new FCCH structure within a TDD MAC frame, in accordance with one embodiment of the invention. It should be understood by one skilled in the art that while TDD-TDM frame structure is used in this example for the purposes of illustration and explanation, the teachings of the present invention are not limited to TDD frame structure but can also be applied to various other frame structures of various durations (e.g., FDD-TDM, etc). As shown in FIG. 7, the TDD MAC frame is partitioned into a downlink phase (also called downlink segment) 701 and an uplink phase (also called uplink segment) 751. In this embodiment, the downlink phase is further divided into three segments for the three corresponding transport channels—the BCH 710, the FCCH 720, and the FCH 730. The uplink phase is further partitioned into two segments for the two corresponding transport channels—the RCH 740 and the RACH 750.

As shown in FIG. 7, the FCCH segment is divided or partitioned into multiple distinct FCCH segments or subchannels, each of which may operate at a specific data rate. In this example, the FCCH segment is divided into four FCCH subchannels (FCCH_0, FCCH_1, FCCH_2, and FCCH_3). In other embodiments of the invention, the FCCH segment may be divided into different numbers of subchannels (e.g., 8 subchannels, etc.), depending on the particular applications or implementations of the invention. In one embodiment, each FCCH subchannel may be associated with a specific set of operating and processing parameters (e.g., code rate, modulation scheme, SNR, etc.). For example, Table 16 below illustrates the code rates, modulation scheme, SNR, etc., that are associated with each FCCH subchannel. In this example, STTD is employed for each of the subchannels, in which case the length of each subchannel is a multiple of two OFDM symbols.

TABLE 16

FCCH Subchannel Data Rates (STTD)

| FCCH Subchannel | Efficiency (bps/Hz) | Code Rate | Modulation | Information Bits Per STTD OFDM symbol | Total SNR for 1% Frame Error Rate (FER) |
|---|---|---|---|---|---|
| FCCH_0 | 0.25 | 0.25 | BPSK | 24 | −2.0 dB |
| FCCH_1 | 0.5 | 0.5 | BPSK | 48 | 2.0 dB |
| FCCH_2 | 1 | 0.5 | QPSK | 96 | 5.0 dB |
| FCCH_3 | 2 | 0.5 | 16 QAM | 192 | 11.0 dB |

As shown in Table 16, each FCCH subchannel has a distinct operating point (e.g., SNR and other processing parameters) associated with it. A user terminal (UT) that is assigned a specific FCCH subchannel (e.g., FCCH_n at a particular rate) can correctly decode all lower rate subchannels, but not those operating at the higher rates. For example, if a particular user terminal is assigned subchannel FCCH_2, that user terminal can decode FCCH_0 and FCCH_1 subchannels because FCCH_0 and FCCH_1 operate at the lower rates. However, that user terminal cannot decode FCCH_3 because FCCH_3 operates at a higher rate. In one embodiment, the access point (AP) decides which FCCH subchannel to send control data to a UT based on various factors or selection criteria. These various factors or selection may include link quality information or operating conditions of the user terminals (e.g., C/I, Doppler, etc.), quality of service (QoS) requirements associated with the user terminals, and control subchannel preference indicated by the user terminals, etc. As described in more details below, the user terminals then attempt to decode each of the FCCH subchannels to determine if they have been allocated resources (e.g., FCH/RCH channel resources).

Table 17 illustrates the structure for the various FCCH subchannels, in accordance with one embodiment of the present invention. As shown in Table 17, the FCCH subchannel structure for subchannel FCCH_0 is distinct from the structure used for other FCCH subchannels (FCCH_1, FCCH_2, and FCCH_3). In one embodiment, the FCCH_MASK field in the FCCH_0 structure is used to indicate the presence/absence of higher rate FCCH subchannels in a particular order. For example, the FCCH_MASK field may comprise three bits each of which corresponds to a particular subchannel and is used to indicate whether the particular subchannel is present in an order from subchannel 1 (MASK bit 0), subchannel 2 (MASK bit 1), and subchannel 3 (MASK bit 2). The corresponding subchannel MASK bit is set to a particular value (e.g., 1) to indicate the presence of the respective subchannel. For example, if the value of MASK bit number 0 (the least significant MASK bit) is set to "1", this indicates the presence of FCCH_1 subchannel. Pad bits are provided to achieve an even number of OFDM symbols in each subchannel. In one embodiment, each FCCH subchannel is capable of providing scheduling information for multiple user terminals (e.g., 32 users). The IE types described above can be used for the FCCH subchannels.

TABLE 17

| FCCH Subchannel Structure | |
|---|---|
| | Bits |
| FCCH_0: | |
| FCCH MASK | 3 |
| No. IE Rate 0 | 5 |
| Rate 0 IE's | |
| 0 Padding | |
| CRC | 16 |
| Tail | 6 |
| FCCH_1: | |
| No. IE Rate 1 | 5 |
| Rate 1 IE's | |
| 0 Padding | |
| CRC | 16 |
| Tail | 6 |
| FCCH_2: | |
| No. IE Rate 2 | 5 |
| Rate 2 IE's | |
| 0 Padding | |

TABLE 17-continued

| FCCH Subchannel Structure | |
|---|---|
| | Bits |
| CRC | 16 |
| Tail | 6 |
| FCCH_3: | |
| No. IE Rate 3 | 5 |
| Rate 3 IE's | |
| 0 Padding | |
| CRC | 16 |
| Tail | 6 |

Figure 8:
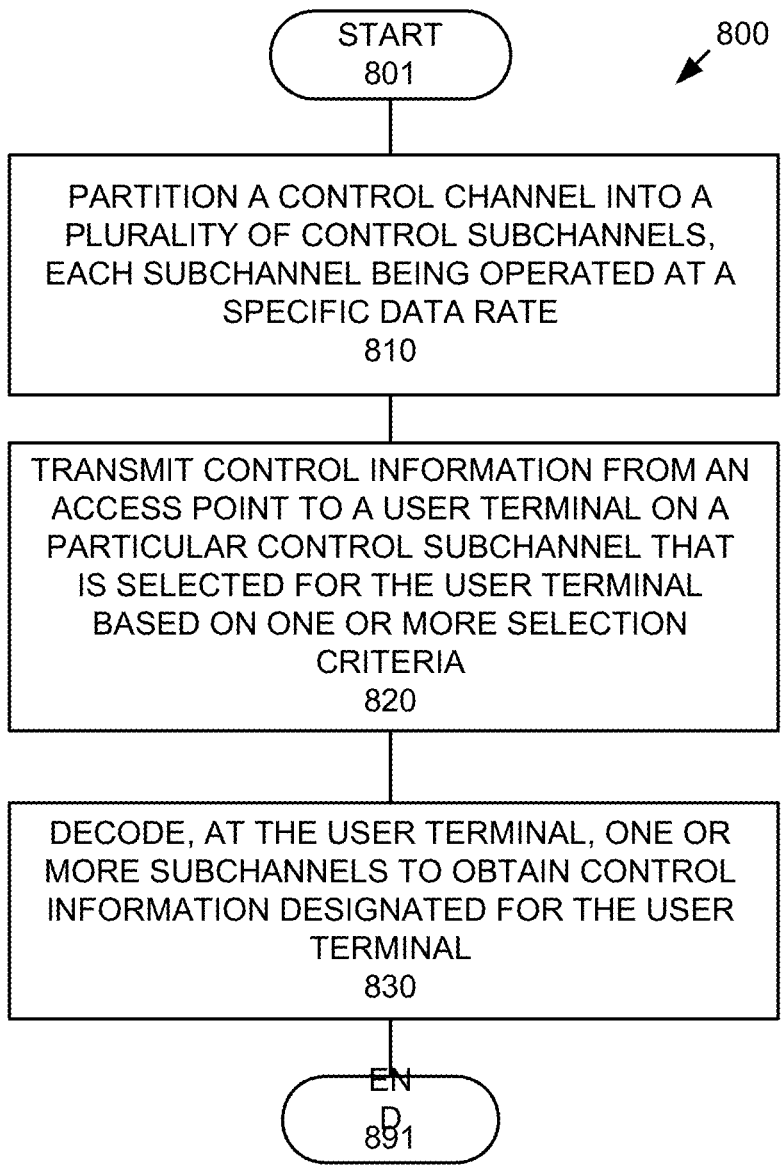
FIG. 8 shows a flow diagram of a method, in accordance with one embodiment of the invention.

FIG. 8 illustrates a flow diagram of a method 800 in accordance with one embodiment of the present invention. At block 810, as described above, a control channel is segregated or partitioned into a plurality of subchannels each of which being operable at a specific data rate. At block 820, control information including resource allocation information is transmitted from an access point to a user terminal on a particular subchannel of the plurality subchannels selected for the user terminal, based on one or more selection criteria, as described above. At block 830, at the user terminal, one or more subchannels of the plurality of subchannels are decoded to obtain control information (e.g., channel assignments) designated for the user terminal. In one embodiment, as explained in more details below, the decoding procedure performed at the user terminal starts with the FCCH subchannel operated at the lowest data rate (FCCH_0 in this example) and continues until at least one of a plurality of conditions is satisfied.

Figure 9:
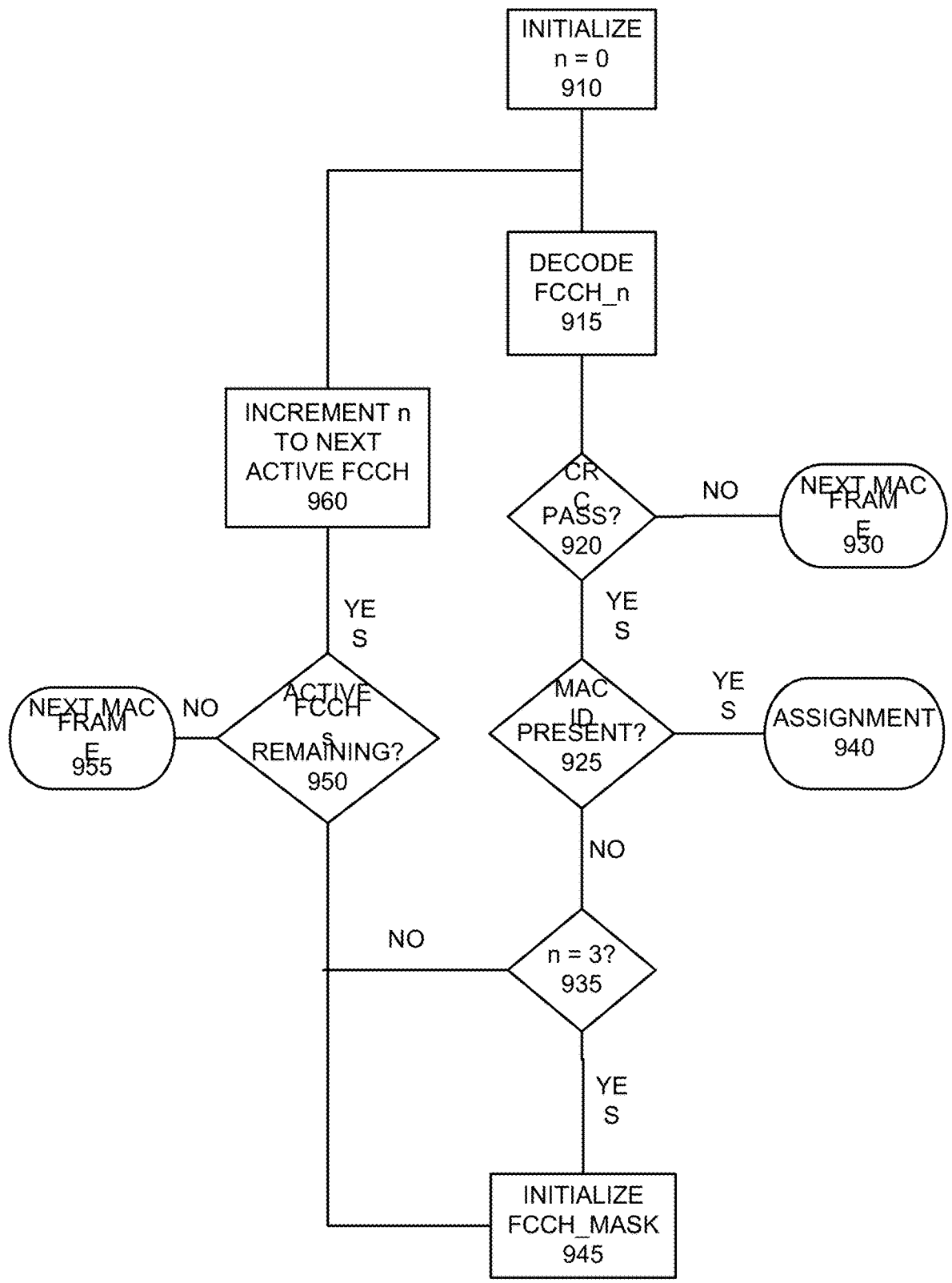
FIG. 9 shows a flow diagram of a decoding process in accordance with one embodiment of the invention.

FIG. 9 shows a flow diagram of a decoding procedure 900 performed by a user terminal in decoding the new FCCH structure, in accordance with one embodiment of the present invention. The user terminal starts by decoding the subchannel FCCH_0. In one embodiment, decoding is considered successful if the CRC test passes. The user terminal terminates FCCH decoding process whenever any of the following events occurs:

(i) Failure to correctly decode an FCCH subchannel;
(ii) Receipt of an assignment;
(iii) Decoding of all active FCCH subchannels without receiving an assignment.

Referring again to FIG. 9, at block 910, the process begins by initializing n to 0. In this example, n is a variable used to indicate the current FCCH subchannel being decoded in the current iteration of the process. At block 915, the current FCCH_n subchannel is decoded. For example, in the first iteration, FCCH_0 is decoded at block 915. At block 920, it is determined whether the CRC test with respect to the current FCCH_n subchannel passes. If the CRC test passes, the process proceeds to block 925 to determine whether the corresponding MAC ID is present, otherwise the process proceeds to block 930 to process the next MAC frame. At block 925, if the corresponding MAC ID is present, the process proceeds to block 940 to obtain the assignment information provided by the access point. Otherwise, the process proceeds to block 935 to check if n is equal to 3. At block 935, if n is equal to 3, the process proceeds to block 945 to initialize the FCCH_MASK field to indicate that all FCCH subchannels have been processed. As described above, in one embodiment, the FCCH_MASK field in the FCCH_0 subchannel structure comprises three bits each of which is used to indicate the presence/absence of a corresponding higher rate FCCH subchannel. For example, the first bit (bit 0 or the least significant bit) of the FCCH_

MASK field is used to indicate the presence/absence of subchannel 1, the second bit (bit 1 or the next significant bit) of the FCCH_MASK field is used to indicate the presence/absence of subchannel 2, and so on. The process then proceeds to block 950 to determine whether there are any active FCCH subchannels remaining to be decoded. If there are more active FCCH subchannels to be decoded, the process proceeds to block 960 to increment n to the next active FCCH subchannel. Otherwise the process proceeds to block 955 to process the next MAC frame.

Various parts of the MIMO WLAN system and various techniques described herein may be implemented by various means. For example, the processing at the access point and user terminal may be implemented in hardware, software, or a combination thereof. For a hardware implementation, the processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the processing may be implemented with modules (e.g., procedures, functions, and so on) that perform the functions described herein. The software codes may be stored in a memory unit and executed by a processor. The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing information in a communication system, comprising:
    partitioning, at an access point, a control region used for transmitting control information into a plurality of subsets of resources;
    selecting, based on one or more selection criteria, a first subset of the plurality of subsets of resources within the control region to be used for transmitting a first portion of the control information from the access point to a first user terminal;
    selecting, based on the one or more selection criteria, a second subset of the plurality of subsets of resources within the control region to be used for transmitting a second portion of control information from the access point to a second user terminal; and
    transmitting the control information in the control region from the access point, wherein the first portion of the control information transmitted on the first subset of resources to the first user terminal is transmitted at a different code rate than the second portion of the control information transmitted on the second subset of resources to the second user terminal.

2. The method of claim 1, wherein the control region comprises a segment of a data frame specifically allocated for transmitting the control information.

3. The method of claim 1, wherein each different code rate is associated with a different set of operating parameters.

4. The method of claim 3, wherein the operating parameters are selected from the group consisting of a modulation scheme and a signal-to-noise ratio (SNR).

5. The method of claim 1, wherein the control information is transmitted on the plurality of subsets of resources sequentially in an order from a subset of resources associated with a lowest code rate to a subset of resources associated with a highest code rate.

6. The method of claim 5, wherein at least one of: the first portion of the control information transmitted on the first subset of resources or the second portion of the control information transmitted on the second subset of resources includes a field to indicate whether control information is also transmitted on another subset of resources.

7. The method of claim 6, wherein the field comprises a plurality of bits, each bit corresponding to a particular subset of resources and indicating whether the corresponding subset of resources is present in the control region.

8. The method of claim 1, wherein the one or more selection criteria comprises at least one of: a link quality associated with the respective user terminal, a quality of service requirement associated with the respective terminal, or a subset of resources preference indicated by the respective terminal.

9. An apparatus for processing information in a communication system, comprising:
    means for partitioning, at the apparatus, a control region used for transmitting control information into a plurality of subsets of resources;
    means for selecting, based on one or more selection criteria, a first subset of the plurality of subsets of resources within the control region to be used for transmitting a first portion of the control information from the apparatus to a first user terminal;
    means for selecting, based on the one or more selection criteria, a second subset of the plurality of subsets of resources within the control region to be used for transmitting a second portion of control information from the apparatus to a second user terminal; and
    means for transmitting the control information in the control region from the apparatus, wherein the first portion of the control information transmitted on the first subset of resources to the first user terminal is transmitted at a different code rate than the second portion of the control information transmitted on the second subset of resources to the second user terminal.

10. The apparatus of claim 9, wherein the control region comprises a segment of a data frame specifically allocated for transmitting the control information.

11. The apparatus of claim 9, wherein each different code rate is associated with a different set of operating parameters.

12. The apparatus of claim 11, wherein the operating parameters are selected from the group consisting of a modulation scheme and a signal-to-noise ratio (SNR).

13. The apparatus of claim 9, wherein the control information is transmitted on the plurality of subsets of resources sequentially in an order from a subset of resources associated with a lowest code rate to a subset of resources associated with a highest code rate.

14. The apparatus of claim 13, wherein at least one of: the first portion of the control information transmitted on the first subset of resources or the second portion of the control information transmitted on the second subset of resources includes a field to indicate whether control information is also transmitted on another subset of resources.

15. The apparatus of claim 14, wherein the field comprises a plurality of bits, each bit corresponding to a particular subset of resources and indicating whether the corresponding subset of resources is present in the control region.

16. The apparatus of claim 9, wherein the one or more selection criteria comprises at least one of: a link quality associated with the respective user terminal, a quality of service requirement associated with the respective terminal, or a subset of resources preference indicated by the respective terminal.

17. An apparatus for processing information in a communication system, comprising:
a controller configured to:
partition, at the apparatus, a control region used for transmitting control information into a plurality of subsets of resources,
select, based on one or more selection criteria, a first subset of the plurality of subsets of resources within the control region to be used for transmitting a first portion of the control information from the apparatus to a first user terminal, and
select, based on the one or more selection criteria, a second subset of the plurality of subsets of resources within the control region to be used for transmitting a second portion of control information from the apparatus to a second user terminal; and
a transmitter configured to transmit the control information in the control region from the apparatus, wherein the first portion of the control information transmitted on the first subset of resources to the first user terminal is transmitted at a different code rate than the second portion of the control information transmitted on the second subset of resources to the second user terminal.

18. The apparatus of claim 17, wherein the control region comprises a segment of a data frame specifically allocated for transmitting the control information.

19. The apparatus of claim 17, wherein each different code rate is associated with a different set of operating parameters.

20. The apparatus of claim 19, wherein the operating parameters are selected from the group consisting of a modulation scheme and a signal-to-noise ratio (SNR).

21. The apparatus of claim 17, wherein the control information is transmitted on the plurality of subsets of resources sequentially in an order from a subset of resources associated with a lowest code rate to a subset of resources associated with a highest code rate.

22. The apparatus of claim 21, wherein at least one of: the first portion of the control information transmitted on the first subset of resources or the second portion of the control information transmitted on the second subset of resources includes a field to indicate whether control information is also transmitted on another subset of resources.

23. The apparatus of claim 22, wherein the field comprises a plurality of bits, each bit corresponding to a particular subset of resources and indicating whether the corresponding subset of resources is present in the control region.

24. The apparatus of claim 17, wherein the one or more selection criteria comprises at least one of: a link quality associated with the respective user terminal, a quality of service requirement associated with the respective terminal, or a subset of resources preference indicated by the respective terminal.

25. A non-transitory computer readable medium having computer executable code stored thereon, comprising:
code for partitioning, at an access point, a control region used for transmitting control information into a plurality of subsets of resources;
code for selecting, based on one or more selection criteria, a first subset of the plurality of subsets of resources within the control region to be used for transmitting a first portion of the control information from the access point to a first user terminal;
code for selecting, based on the one or more selection criteria, a second subset of the plurality of subsets of resources within the control region to be used for transmitting a second portion of control information from the access point to a second user terminal; and
code for transmitting the control information in the control region from the access point, wherein the first portion of the control information transmitted on the first subset of resources to the first user terminal is transmitted at a different code rate than the second portion of the control information transmitted on the second subset of resources to the second user terminal.

26. The non-transitory computer readable medium of claim 25, wherein the control region comprises a segment of a data frame specifically allocated for transmitting the control information.

27. The non-transitory computer readable medium of claim 25, wherein each different code rate is associated with a different set of operating parameters.

28. The non-transitory computer readable medium of claim 27, wherein the operating parameters are selected from the group consisting of a modulation scheme and a signal-to-noise ratio (SNR).

29. The non-transitory computer readable medium of claim 25, wherein the control information is transmitted on the plurality of subsets of resources sequentially in an order from a subset of resources associated with a lowest code rate to a subset of resources associated with a highest code rate.

30. The non-transitory computer readable medium of claim 29, wherein at least one of: the first portion of the control information transmitted on the first subset of resources or the second portion of the control information transmitted on the second subset of resources includes a field to indicate whether control information is also transmitted on another subset of resources.

* * * * *